(12) United States Patent
Minagawa

(10) Patent No.: US 7,057,747 B1
(45) Date of Patent: Jun. 6, 2006

(54) MANAGEMENT OF PRINTER SETTINGS

(75) Inventor: Tomonori Minagawa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/492,336

(22) Filed: Jan. 27, 2000

(30) Foreign Application Priority Data

Jan. 29, 1999 (JP) .............................. 1999/021682

(51) Int. Cl.
*G06F 15/00* (2006.01)
(52) U.S. Cl. ...................... 358/1.13; 358/1.15; 358/1.1
(58) Field of Classification Search ............... 358/1.14, 358/1.13, 1.12, 1.15–1.16, 1.9, 1.1, 1.2, 1.17, 358/524, 403, 402; 710/2, 8, 10, 14
See application file for complete search history.

(56) References Cited

U.S. PATENT DOCUMENTS

| | | | |
|---|---|---|---|
| 5,768,483 A * | 6/1998 | Maniwa et al. ............ | 358/1.15 |
| 6,149,323 A * | 11/2000 | Shima ........................ | 400/76 |
| 6,384,923 B1 * | 5/2002 | Lahey ....................... | 358/1.13 |
| 6,424,429 B1 * | 7/2002 | Takahashi et al. ......... | 358/1.16 |
| 6,445,468 B1 * | 9/2002 | Tsai ........................... | 358/402 |

FOREIGN PATENT DOCUMENTS

JP 08152985 A * 6/1996

OTHER PUBLICATIONS

U.S. Appl. No. 09/411,631, filed Oct. 1, 1999.

* cited by examiner

*Primary Examiner*—Gabriel Garcia
*Assistant Examiner*—Thierry L. Pham
(74) *Attorney, Agent, or Firm*—Fitzpatrick, Cella, Harper & Scinto

(57) ABSTRACT

A user interface which is easier to operate in that, when a user performs printing setting, a plurality of setting items divided into a plurality of sheets can be set together in one package with no need of setting the setting items separately. In an information processing apparatus for producing printing data, which is interpretable by a printer, based on document data produced by an application, when printing setting is performed to produce the printing data by using the plurality of setting sheets, a plurality of setting items separated into the plurality of setting sheets are combined into a combined setting, and the combined setting is registered in a combined setting list. When one of the combined settings registered in the combined setting list is selected, all the setting items of the one combined setting are set and displayed in a plurality of setting sheets.

28 Claims, 27 Drawing Sheets

FIG. 29

STORAGE MEDIUM SUCH AS FD/CD-ROM

| DIRECTORY INFORMATION |
|---|
| FIRST DATA PROCESSING PROGRAM<br>PROGRAM CODE GROUP CORRESPONDING TO STEPS OF FLOWCHART SHOWN IN FIG. 4 |
| SECOND DATA PROCESSING PROGRAM<br>PROGRAM CODE GROUP CORRESPONDING TO STEPS OF FLOWCHART SHOWN IN FIG. 6 |
| THIRD DATA PROCESSING PROGRAM<br>PROGRAM CODE GROUP CORRESPONDING TO STEPS OF FLOWCHART SHOWN IN FIG. 7 |
| FOURTH DATA PROCESSING PROGRAM<br>PROGRAM CODE GROUP CORRESPONDING TO STEPS OF FLOWCHART SHOWN IN FIG. 13 |
| FIFTH DATA PROCESSING PROGRAM<br>PROGRAM CODE GROUP CORRESPONDING TO STEPS OF FLOWCHART SHOWN IN FIG. 16 |
| SIXTH DATA PROCESSING PROGRAM<br>PROGRAM CODE GROUP CORRESPONDING TO STEPS OF FLOWCHART SHOWN IN FIG. 18 |
| SEVENTH DATA PROCESSING PROGRAM<br>PROGRAM CODE GROUP CORRESPONDING TO STEPS OF FLOWCHART SHOWN IN FIG. 22 |
| EIGHTH DATA PROCESSING PROGRAM<br>PROGRAM CODE GROUP CORRESPONDING TO STEPS OF FLOWCHART SHOWN IN FIG. 23 |
| BUFFER AREA HOLDING CURRENT SETTING |
| FAVORITE DB (AREA FOR REGISTERING FAVORITES) |
| STAMP DB (AREA FOR REGISTERING STAMPS) |

MEMORY MAP OF STORAGE MEDIUM

MANAGEMENT OF PRINTER SETTINGS

BACKGROUND OF THE INVENTION

1. Field of the Invention

The present invention relates to an information processing apparatus and an information processing method which enable printer settings to be made efficiently by handling a plurality of setting items together in a user interface (referred to as a "UI" hereinafter) through which users perform printing setting. Also, the present invention relates to a storage medium storing a sequence of such processing.

2. Description of the Related Art

Generally, users can adjust various types of printer settings through a user interface in an information processing apparatus for producing printing data, which can be interpreted by a printer, based on document data created using an application. Some user interfaces for printer drivers contain many items of printer settings in complicated mutually depending relation. Those user interfaces have a function of registering several setting items in one package and changing those plural setting items together when the registered setting is selected by the user.

Taking a printer driver made by Canon Inc. as an example, "printing object setting" is prepared. With this function, items regarding printing quality, such as a graphic mode, resolution, color setting, and replacement of TrueType font, are set and registered in association with icons beforehand, and one of the icons adapted for the printing object is selected at the time of starting printing so that the setting of plural printing items is changed together.

However, the above "printing object setting" is intended to change only graphic-related items regarding printing quality in one package. In spite of package conversion, therefore, only the items regarding printing quality are changeable and users have to seta printing format and a paper size each time. Another problem of the above "printing object setting" is that items can be registered and selected only from a sheet for setting the printing quality and the setting cannot be changed unless the sheet is opened.

While a variety of functions are included in recent printers and printer drivers, the above-mentioned printer driver does not include settings for input paper, output paper, a paper feed method, a paper ejection method, the number of copies, page layout, etc., and these items must be set separately. In other words, the above-mentioned printer driver is not adaptable for needs that will be more diversified in future. For example, when documents need to be printed in several particular formats for entitles such as banks, insurance companies and so on, printing must be performed using a variety of printing settings, such as printing quality, paper size, paper feed method, etc. Nevertheless, these individual items in diverse setting categories must be set separately for each format, and this is very inconvenient for the user.

SUMMARY OF THE INVENTION

A first object of the present invention is therefore to broaden the scope of items capable of being registered in a printer driver (referred to, herein, as "global registration").

A second object of the present invention is to eliminate a duplication of registration function that may result when the registerable items are broadened.

A printer driver made by Canon Inc., for example, has a water mark printing function called "stamp". With this function, printing attributes such as an overlapped character string and font, including the type, size, angle and color thereof, are previously registered in a stamp DB (database) in one package with some name assigned to the package. By entering the assigned name as a key and selecting the registered package, a particular pattern can be easily printed in an overlapped fashion. In the case where the global registration contains such stamp setting as one of the attributes thereof, if the stamp DB is updated after registering the stamp setting in the global registration along with the name (key), the contents registered in the stamp DB become different from those set in the global registration. When the global registration containing the stamp attribute is selected at this time, it is not clear to a system whether the contents of the stamp setting should be set to those in the global registration or to the updated contents. The present invention is intended to eliminate such a drawback.

Furthermore, in the related art, there is known a function of enabling printing quality to be simply selected, the function being called "printing object" and registered in a printer driver beforehand. With such a function, a plurality of combinations of control groups regarding printing quality are registered in the form of programs beforehand, and when one of the combinations is selected, setting items corresponding to the selected combination are changed in one package. Attributes registered in the printing object depend on models of printers. The reason is that even when the same mode of "photographic image", for example, is selected, optimum setting differs from each other between a printer having a high color gradation and a printer having a high resolution. Assuming the case where the printing object is registered in one model of printer under selection of the mode of "photographic image" and are then exported to another model, printing is performed in the another model with its own setting of "photographic image" when the same mode of "photographic image" is selected. In some cases, however, a user sets various attributes by himself and then registers them in the printing object. Particularly when those various attributes are exported to another model, a printer driver of the another model cannot change the setting at its discretion because the imported various attributes are custom-set by the user. Further, because the base setting is itself different between the models, display of the base setting is meaningless, thus resulting in very obscure display of information.

To solve the problems set forth above, the present invention provides an information processing apparatus for producing printing data, which is interpretable by a printer, based on document data produced by an application, the apparatus comprising a combined setting registration unit for combining a plurality of setting items separated into a plurality of setting sheets into one combined setting and registering the combined setting in a combined setting list when printing setting is performed to produce the printing data by using the plurality of setting sheets; a selection unit for selecting one of the combined settings registered in the combined setting list; and a display control unit for performing control to set and display all the setting items of one combined setting in a plurality of setting sheets when the one combined setting is selected by the selection unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 29 is a table showing a memory map of a storage medium in which data processing programs and data are stored.

DESCRIPTION OF THE PREFERRED EMBODIMENT

Preferred embodiments of the present invention will be described below in detail with reference to the drawings.

Figure 1:
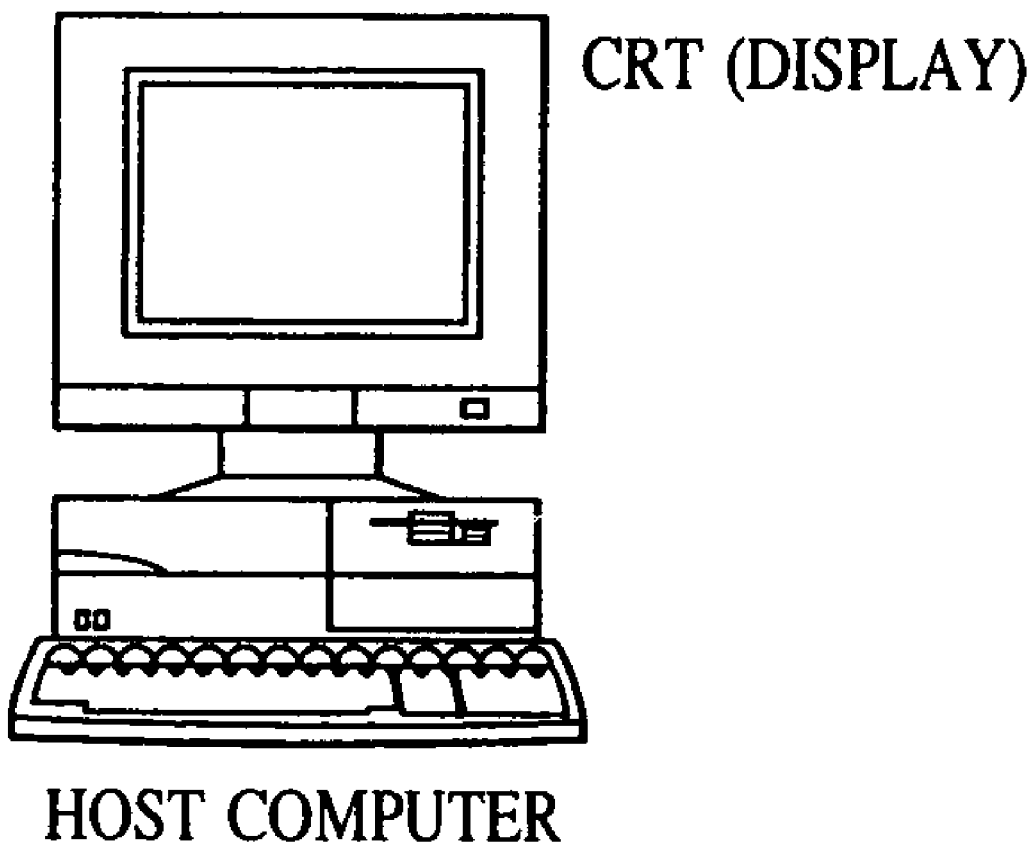
FIG. 1 is a front view showing one example of a system construction used to implement the present invention.

FIG. 1 is a front view for explaining an appearance of an information processing apparatus to which the present invention can be applied. The information processing apparatus is made up of components of the so-called PC (personal computer), such as a display, a data processing body (including a control board, a hard disk, a floppy disk drive, and a CD-ROM drive), and an input device (including a keyboard and a not-shown pointing device).

The First Embodiment

Figure 2:
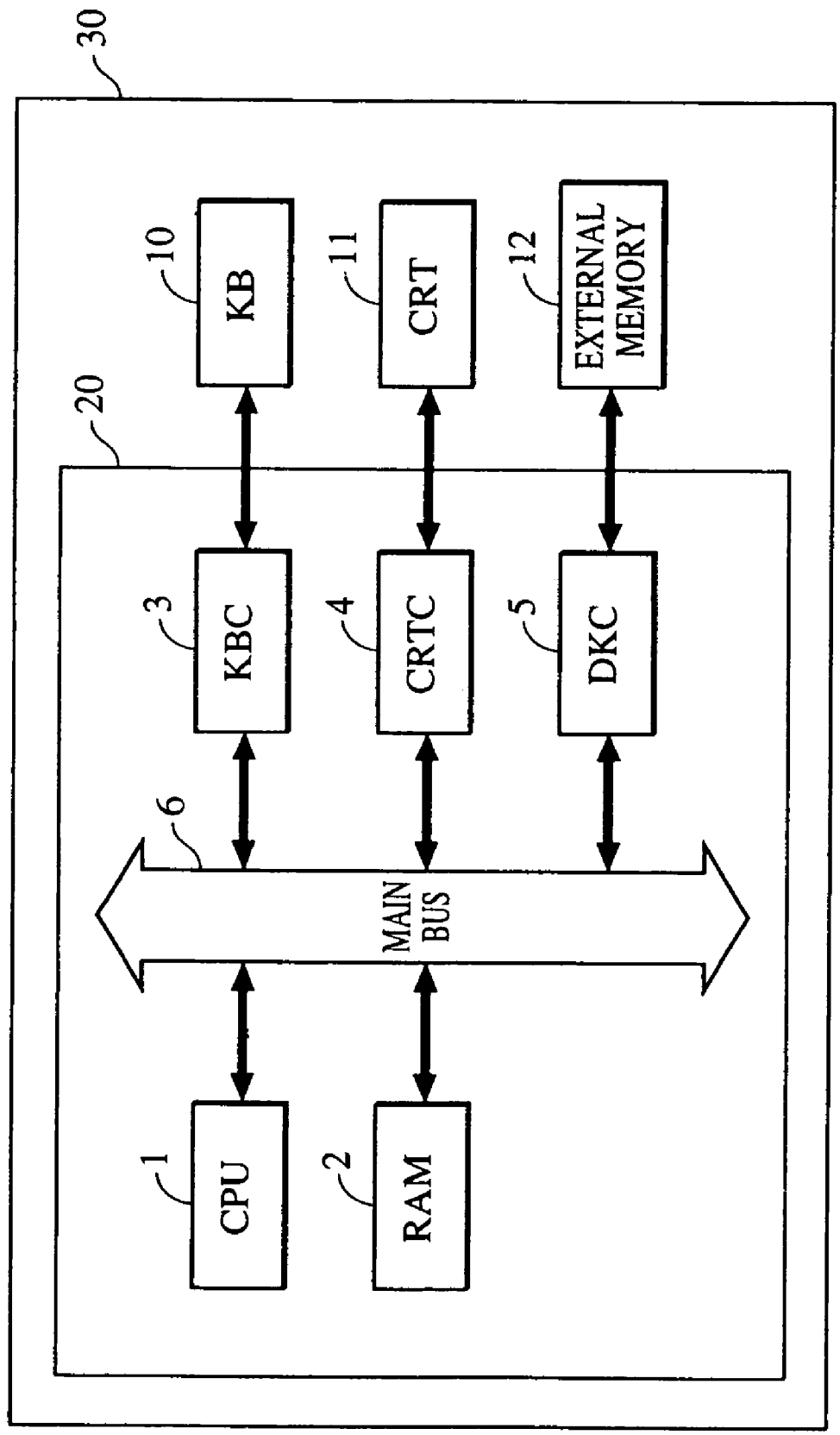
FIG. 2 is a block diagram of a host computer.

FIG. 2 is a block diagram for explaining a configuration of the information processing apparatus according to the first embodiment of the present invention. In the illustrated case, the information processing apparatus comprises a host computer body 30, and a host-computer internal section 20 for controlling the host computer body 30.

In the host-computer internal section 20, numeral 1 denotes a CPU for loading various programs, such as a control program, a system program and an application program which are read from an external memory 12, in a RAM 2 (described later) via a disk controller (DKC) 5. The CPU 1 then runs the loaded program to carry out various data processing. The disk controller (DKC) 5 controls an access to a boot-up program, various applications, and an external memory 12 for storing data files, etc., such as an FD, HD, CD-ROM, MD or MO.

The RAM 2 has a capacity extendable with an option RAM or the like (not shown), and primarily functions as a work area for the CPU 1.

Numeral 3 denotes a keyboard controller (KBC) for controlling a key input from a keyboard 10 and a pointing device (not shown). Numeral 4 denotes a CRT controller (CRTC) for controlling display on a CRT display (CRT) 11. Numeral 6 denotes a main bus.

Note that, unless otherwise specified, the CPU 1 controls the RAM 2, KBC 3, the CRTC 4, and the DKC 5 via the main bus 6 for execution of processing.

The external memory 12 is a nonvolatile storage means such as a hard disk. The external memory 12 stores, e.g., an application program for producing document data, a printer driver program for producing printing data in the form of PDL (Page Description Language) and/or low-level image data, which can be analyzed by a printer, based on document data produced by a user using the application program.

In such a system, when detailed setting of an application and a device driver (e.g., printer driver) is changed by opening a user interface (UI), an instruction is inputted by the user through the KB 10 or the pointing device (not shown), and a condition or process of the setting change is displayed as a screen image on the CRT 11.

As described later, functions "favorite" and "stamp" are registered and read in the present invention. It is assumed that, unless otherwise specified, registration is made on the RAM or the external memory 12.

This embodiment is constituted such that all setting items selectable in printing setting are available to be registered. New registration and selection of registered icons can be made from any of the setting sheets, and items in all of the sheets can be changed together in one package. With this feature, it is possible to perform registration and package change of a multi-combination of printing features, including paper size, paper feed slit, etc., and to achieve a system adaptable for various needs.

However, items which greatly depend on models, e.g., setting of device options, are not made able to be registered because there occurs a problem if those items are exported.

When utilizing the global registration which contains, as an attribute, a function capable of changing the setting thereof as with the "stamp", there may occur conflicts between the contents of different settings. Such conflicts can be avoided by adding a temporary option in which the contents of the setting registered in the global registration can be temporarily employed. Concretely, the system operates as follows.

Consider the case where the global registration is set to use the "stamp" so that an icon representing the "stamp" is selected. But suppose that the "<not registered stamp>" is added as another stamp option and the stamp setting registered in the global registration is assigned to the added option. Accordingly, there are two stamp options; i.e., the existing one and the "<not registered stamp>". When the existing option is selected, the setting in the stamp DB becomes effective, and when the "<not registered stamp>" is selected, the setting registered in the global registration becomes effective. To realize such a choice, a stamp key is cleared at the time of making the global registration.

More specifically, if there is a stamp key (stamp name in practice), the setting in the stamp DB is used, and if there is no stamp key, the "<not registered stamp>" (i.e., the stamp setting in the "favorite") is used. This enables both the settings to be separately used in a proper manner even with a difference therebetween.

In the case where the global registration not having the stamp attribute (with the "stamp" turned off) is selected, the "<not registered stamp>" is not displayed as the stamp option. Thus, the "<not registered stamp>" is a temporary option for employing the attributes of the global registration.

Similar processing as described above is also carried out when custom setting is made on the printing object.

In the case when global registration is accomplished by selecting one existing option of the printing object, the printing object attribute is displayed as an option key. Upon selection of the global registration in this manner, the printing object attribute having been selected at the time of registration becomes a current option. On the other hand, in the case where a user performs the global registration with additional changes to the detailed settings, the option key is cleared based on a judgement that the user desires to manually change the settings. Upon selection of the global registration without using the printing object key, "another setting" is added to the printing object and becomes a current option. The detailed setting registered at the time of making the global registration is assigned to that current option.

The above-described operation is meaningful in that particularly when the setting is exported to another printer driver model, the user can recognize what setting has been selected.

Figure 3:
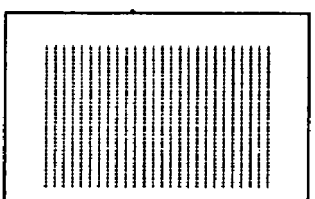
FIG. 3 is a representation showing an example of a dialog (box) including a control for operating a function "favorite"

DLG1 in FIG. 3 shows one example of a dialog box which represents the property of a printer driver and is displayed on the CRT 11 shown in FIG. 2. Using the dialog box, the user can perform, for example, registration, selection and addition of printing attributes including printing quality and printing format, and editing of management information through the KB 10. The function of registering a plurality of printing attributes, including printing quality and printing format, will be referred to as "favorite" hereinafter. Also, the setting registered by the "favorite" will be referred to as the combined setting. Thus, the combined setting means setting a plurality of printing attributes, including printing quality and printing format, which are registered together in one package. As described later, the combined setting can be handled for registration and selection from any of a plurality of setting sheets.

Control of the information processing apparatus regarding general processing of the "favorite" will be described below with reference to the dialog box example of FIG. 3 and the flowchart of FIG. 4.

First, in step S401, the CPU 1 determines whether the current "favorite" selection (i.e., setting of the "favorite" currently selected) has been changed by the user operating a combo box LST11 in the DLG1 through the KB 10. If the CPU 1 determines whether the current "favorite" selection has been changed, then it executes a sequence of processing associated with a change in the selection of the "favorite" in step S402. Details of the step S402 will be described later. In step S403, the CPU executes conflict dealing processing related to the current setting. Details of the step S403 will be described later. In step S404, the CPU changes controls of all sheets in accordance with the new setting and returns the processing to step S401.

If the current "favorite" selection has not been changed in step S401, then the CPU 1 determines in step S405 whether an add button BTN11 has been depressed by the user. If it is determined that the add button BTN11 has been depressed, then the CRTC 4 displays a dialog box DLG2 shown in FIG. 12 on the CRT 11 and executes a sequence of processing related to the registration in step 406. Details of the step S406 will be described later. In step S407, the CRTC changes display of the "favorite" in LST11 such that the newly registered name becomes a current name (i.e., a name currently selected), and returns the processing to step S401.

If it is determined in step S405 that the add button BTN11 has not been depressed, then the CPU 1 determines in step S408 whether an edit button BTN12 has been depressed by the user. If it is determined that the edit button BTN12 has been depressed, then the CRTC 4 displays a dialog box DLG3 shown in FIG. 17 on the CRT 11 and executes a sequence of processing related to editing of the management information in step S409. Details of the step S409 will be described later.

Figure 5:
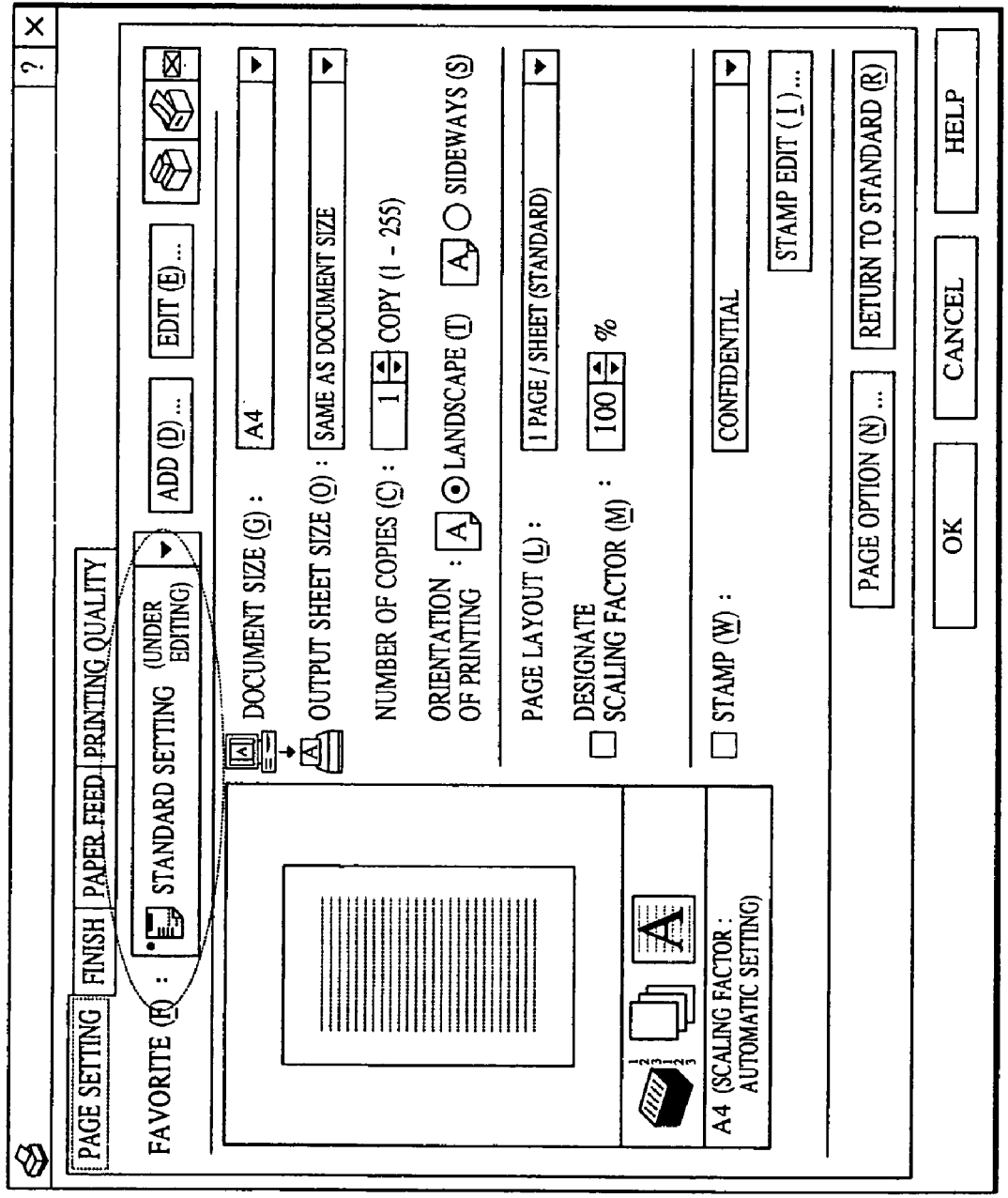
FIG. 5 is a representation showing an example of the dialog for the "favorite" displayed when detailed setting is changed.

If it is determined in step S408 that the edit button BTN12 has not been depressed, then the CPU determines in step S410 whether any attribute (detailed setting) other than the add button BTN11 and the edit button BTN12 has been changed by the user. If it is determined that the detailed setting of any attribute has been changed, this means that the changed setting differs from the contents of the selected "favorite" setting in LST11. Therefore, the CRTC 4 processes the display in LST11 in step S411 in response to this change in the detailed setting. Concretely, by way of example, a display color is changed from black to another color, or a text of the displayed name is changed. FIG. 5 shows an example of the dialog displayed after the display has been changed.

In step S412, the CPU 1 determines whether the user has closed the dialog. If not closed, then the CPU returns the processing to step S401, and the above processing is repeated until the user closes the dialog.

Figure 6:
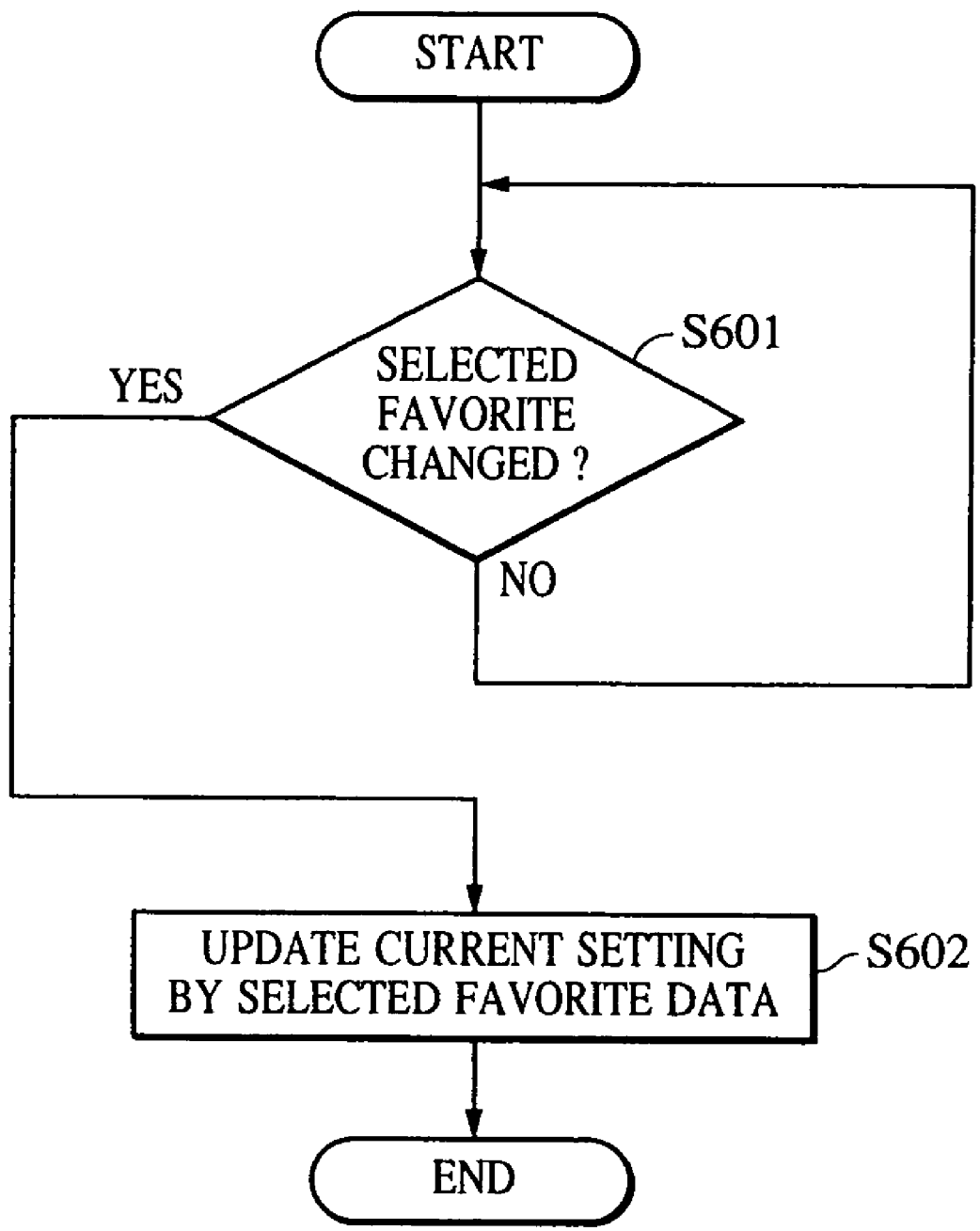
FIG. 6 is a flowchart of processing when the "favorite" is changed.

Next, a sequence of processing related to selection of the "favorite" and executed in step S402 of the flowchart shown in FIG. 4 will be described with reference to a flowchart shown in FIG. 6.

First, in step S601, the CPU 1 determines whether the currently selected "favorite" has been changed to another registered favorite setting. If it is determined that the "favorite" has been changed and confirmed, then the CPU updates a buffer area holding the current setting by the attributes of the selected "favorite" in step S602. All controls on the UI including not only the current page, but also other inactive pages are updated. More specifically, in FIG. 3, the current page represents "page setting". When the "favorite" is changed to another registration setting in this page, setting items in all sheets (pages), including inactive pages of "finish", "paper feed" and "printing quality", can be updated. In other words, the setting items which can be updated are the same regardless of on which sheet the currently selected setting is changed. For example, if the currently selected "favorite" has been changed on the "finish" page, setting items in the other pages of "page setting", "paper feed" and "printing quality" can also be updated.

Concrete examples of items which can be registered and changed by package conversion are as follows:

Size of input/output paper, paper orientation, the number of copies, page layout (such as Nup and poster) representing page format, scaling-up/down rate, stamp, overlay, printing method (one-side, both-side and bookbinding printing), details of the bookbinding printing, binding direction, binding allowance, paper ejection method (such as sorting and stapling), stapled position, paper feed method (such as same feeding throughout all pages and different feeding between the start and the end), paper name, printing object, resolution, color setting, etc.

(Conflict Processing)

Figure 7:
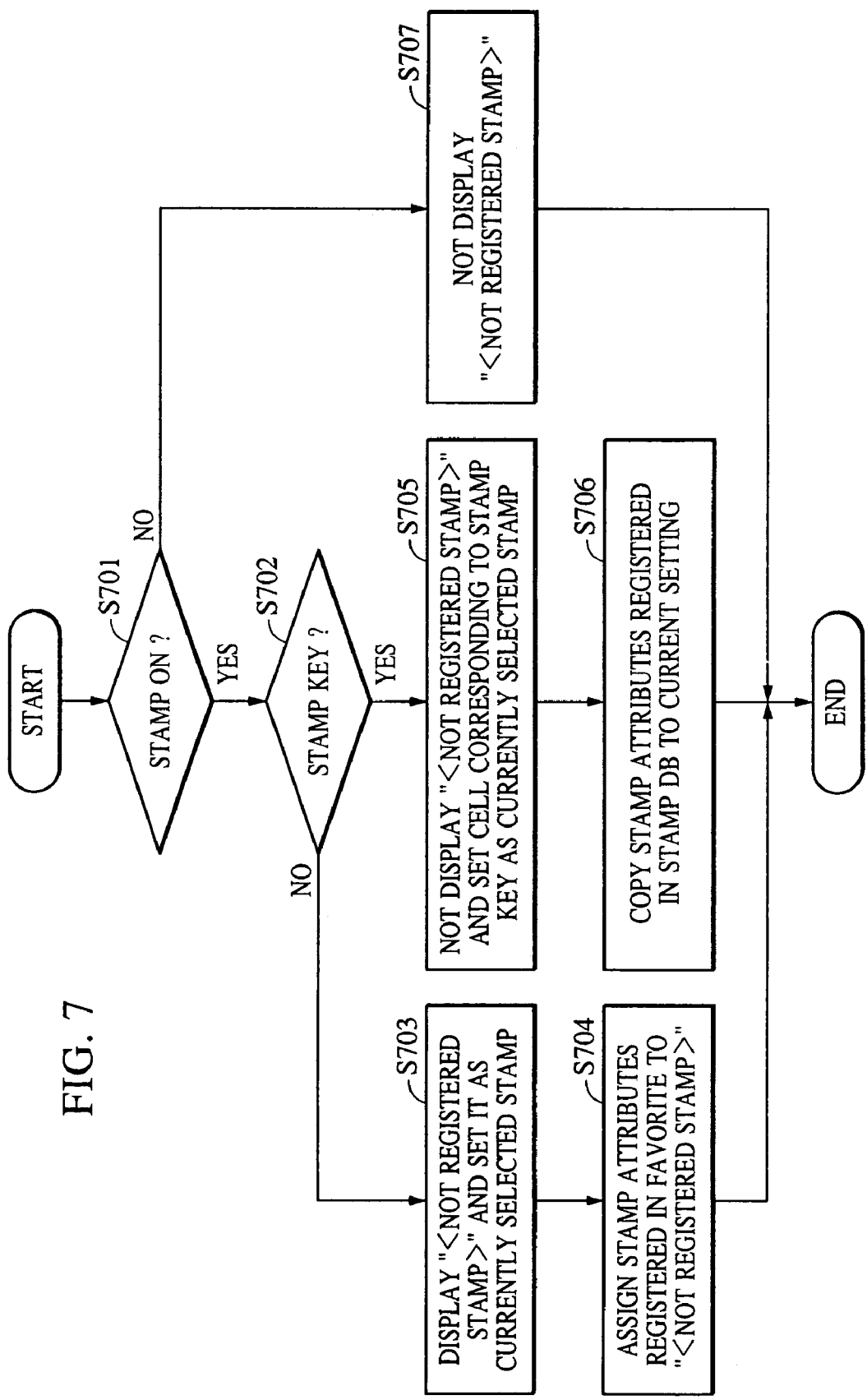
FIG. 7 is a flowchart of stamp conflict processing when the "favorite" is selected.

The conflict processing executed in step S403 of the flowchart shown in FIG. 4 will be described with reference to a flowchart shown in FIG. 7.

Figure 4:
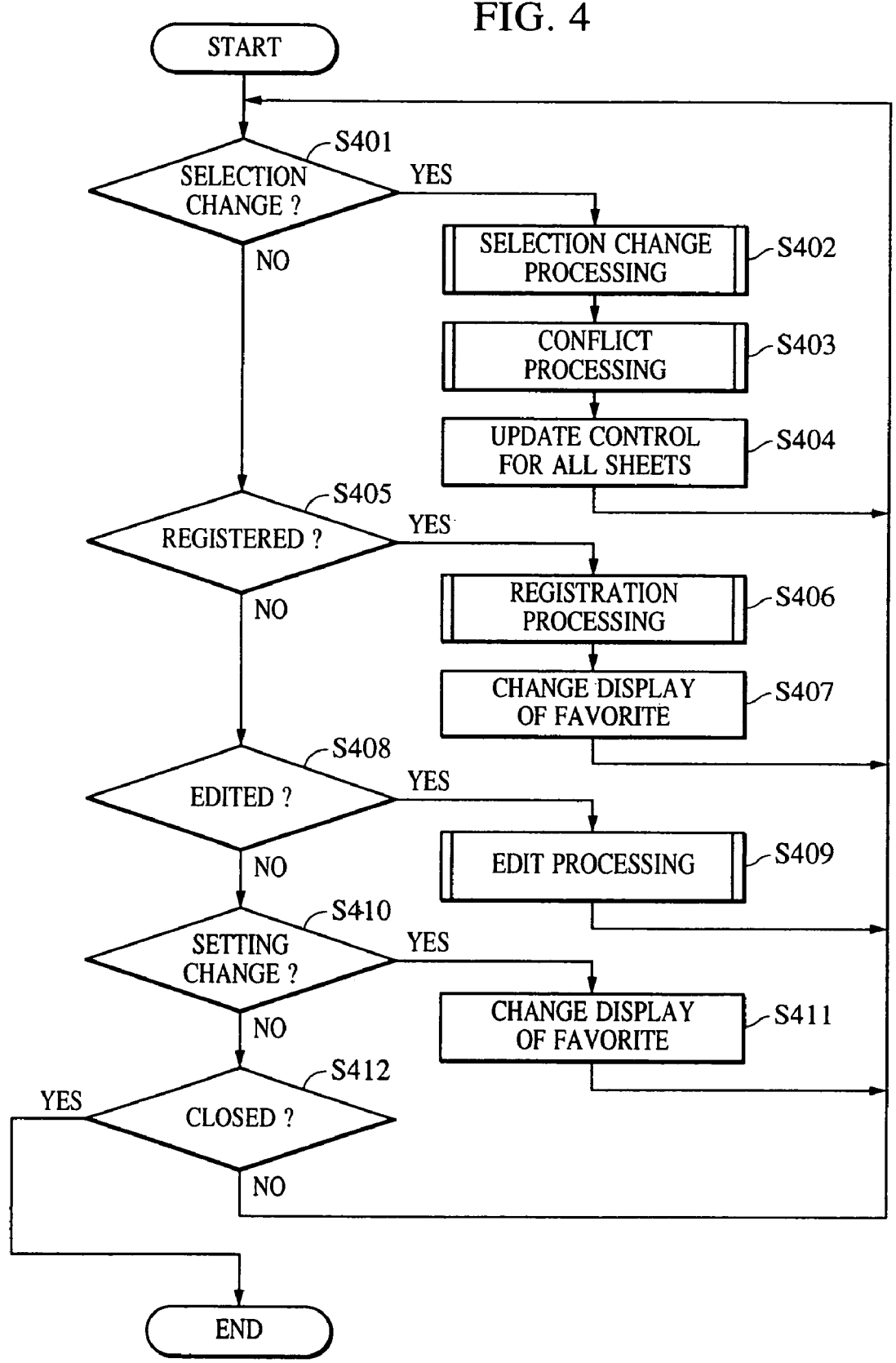
FIG. 4 is a flowchart showing an overall flow of the "favorite"

First, in step S701, the CPU 1 determines whether an item "stamp (W):" in FIG. 3 is checked and the stamp function is turned on in the "favorite" setting selected in step S401 of FIG. 4. If it is determined that the stamp function is employed (FIG. 8), then the CPU 1 checks in step S702 whether there is any "key (detailed setting or name)" of the stamp. The stamp name is, e.g., "COPY", "CONFIDENTIAL" and "DRAFT" held in a combo box on the right side of a check box "stamp (W):". The stamp detailed setting includes, e.g., "coordinate", "angle", "text (contents of the stamp)", "font", "style", "size", "color", "enclosure", "watermark/overlapped", and "print page", as shown in FIG. 9.

If there is no stamp "key" (i.e., if there is no stamp having the same detailed setting or name), then the CPU adds an option "<not registered stamp>", for example, to a stamp list in the RAM 2 and sets the option to a current stamp in step S703. This option is intended to employ the stamp attributes registered in the "favorite". Further, in step S704, the CPU assigns the stamp setting to the added option so that the setting registered in the "favorite" is employed when the added option is selected later.

If it is determined in step S702 that there is a stamp key, then the CPU does not add the option "<not registered stamp>" to the stamp list and sets the stamp corresponding to the "key" to a current stamp in step S705. Thereafter, in step S706, the stamp corresponding to the stamp key in the "favorite" is retrieved from the stamp DB in the external memory 12, and the retrieved stamp setting is copied to the current setting for use.

If it is determined in step S701 that the stamp is not employed at all in the setting (FIG. 10), then the CPU does not list the option "<not registered stamp>" in step S707 (see the area surrounded by an oblong circle).

Figure 8:
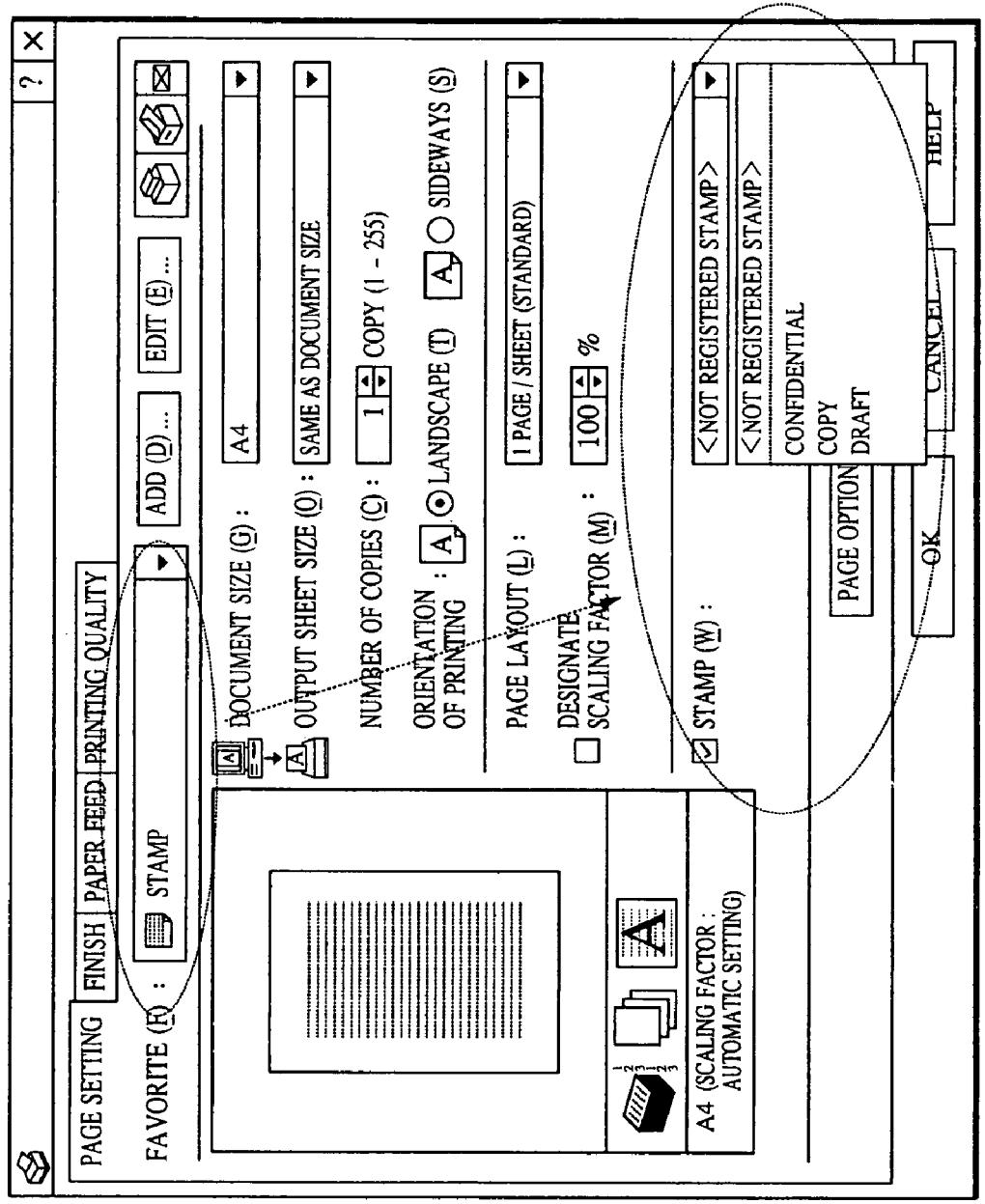
FIG. 8 is a representation showing an example (1) in which "<not registered stamp>" is displayed.
Figure 9:
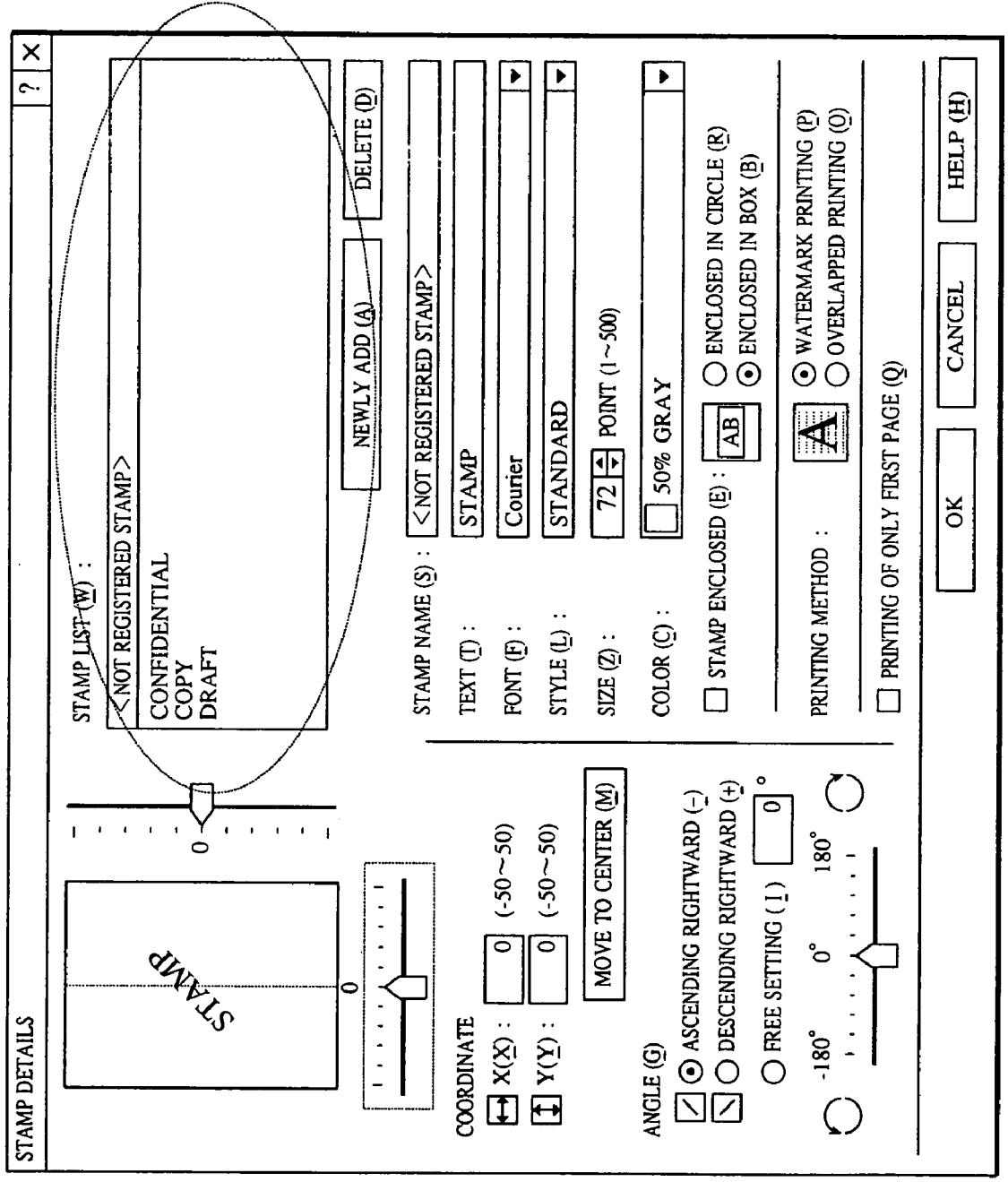
FIG. 9 is a representation showing an example (2) in which "<not registered stamp>" is displayed.
Figure 10:
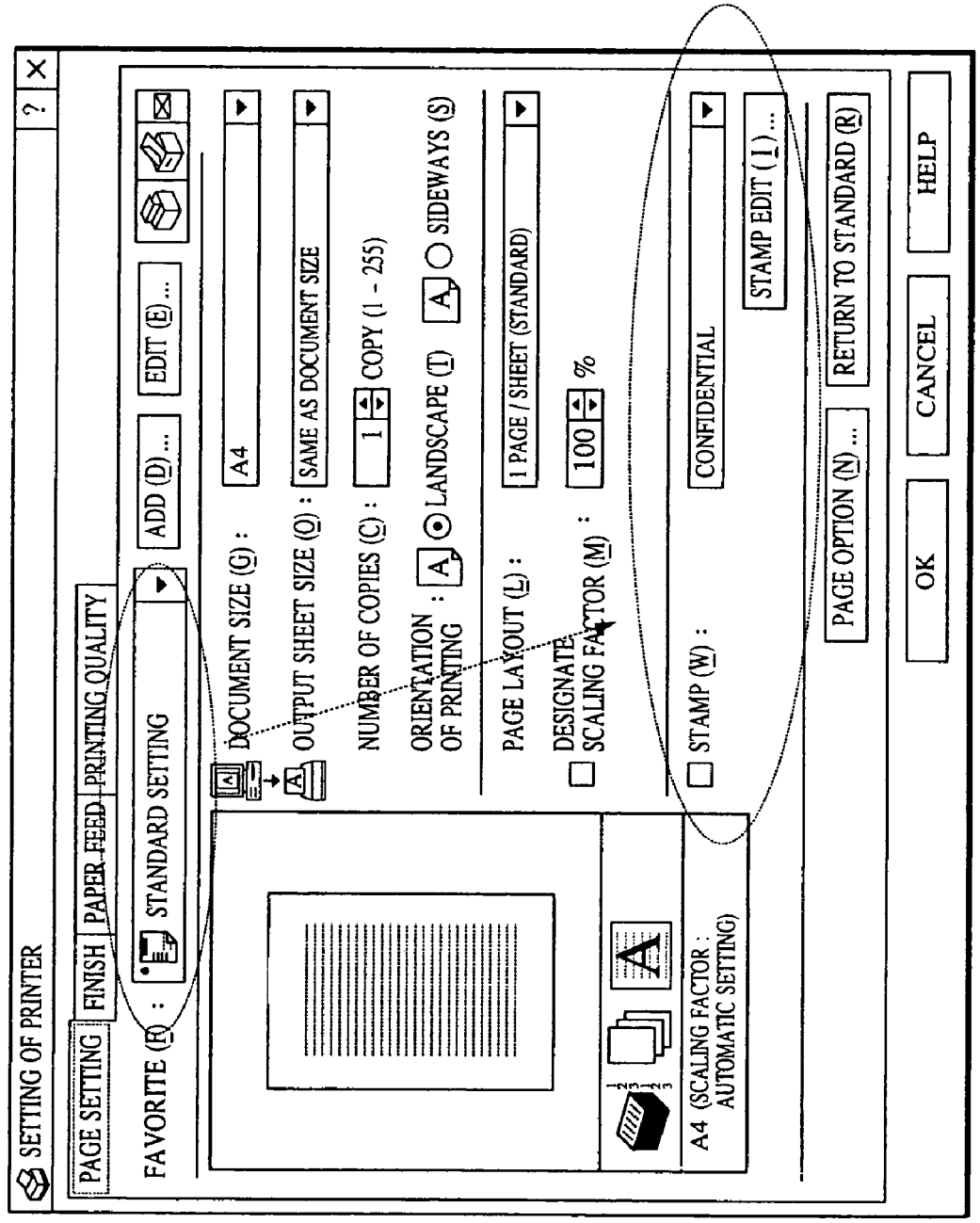
FIG. 10 is a representation showing an example (1) in which "<not registered stamp>" is not displayed.
Figure 11:
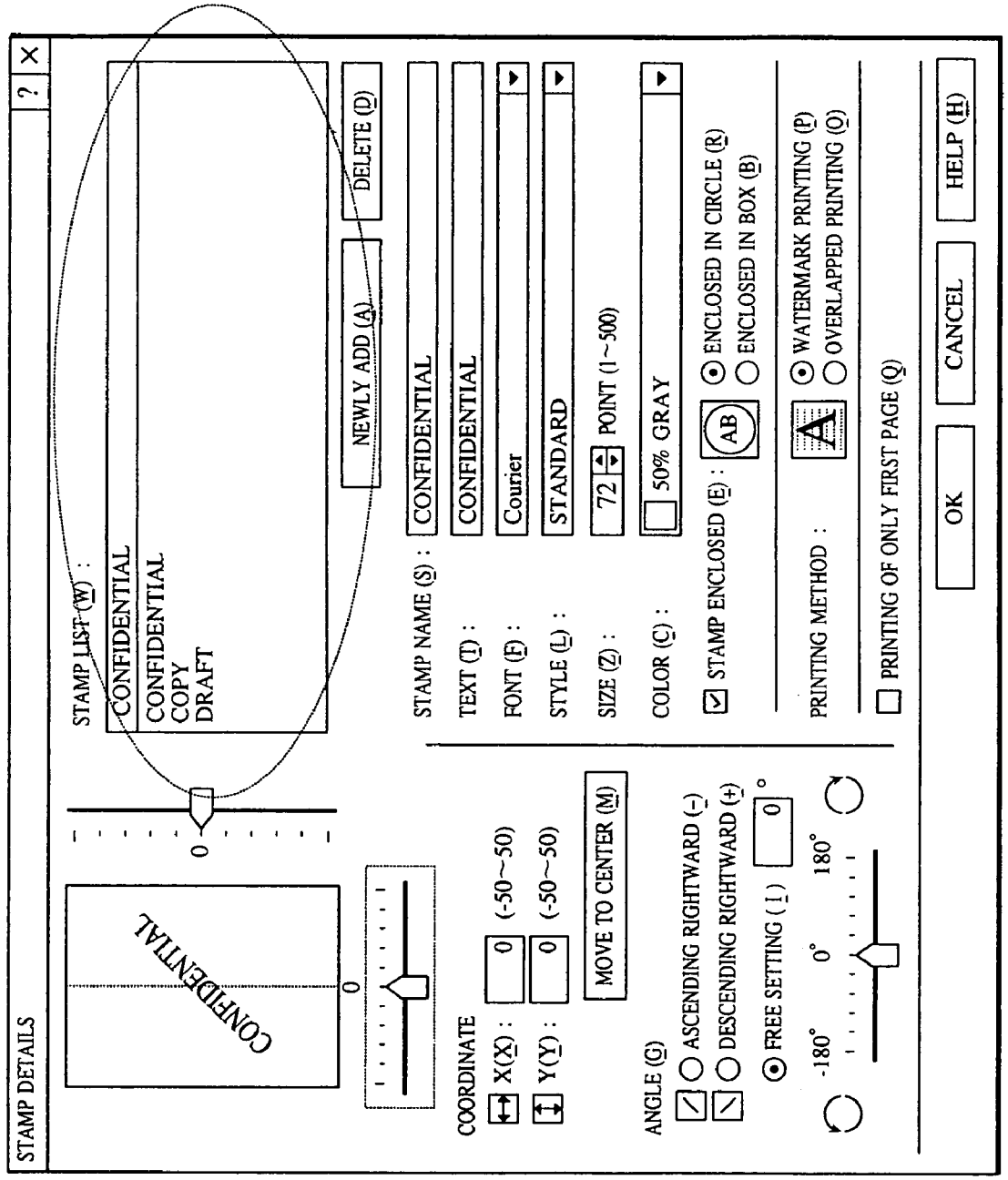
FIG. 11 is a representation showing an example (2) in which "<not registered stamp>" is not displayed.

FIGS. 8 and 9 each show an example of the UI dialog (which contains "<not registered stamp>" in the list) displayed when the "favorite" with the stamp turned on and the same stamp key being not in the list is selected. FIGS. 10 and 11 each show an example of the UI dialog (which does not contain "<not registered stamp>" in the list) displayed when the stamp is turned off.

(Registration Processing)

Figure 12:
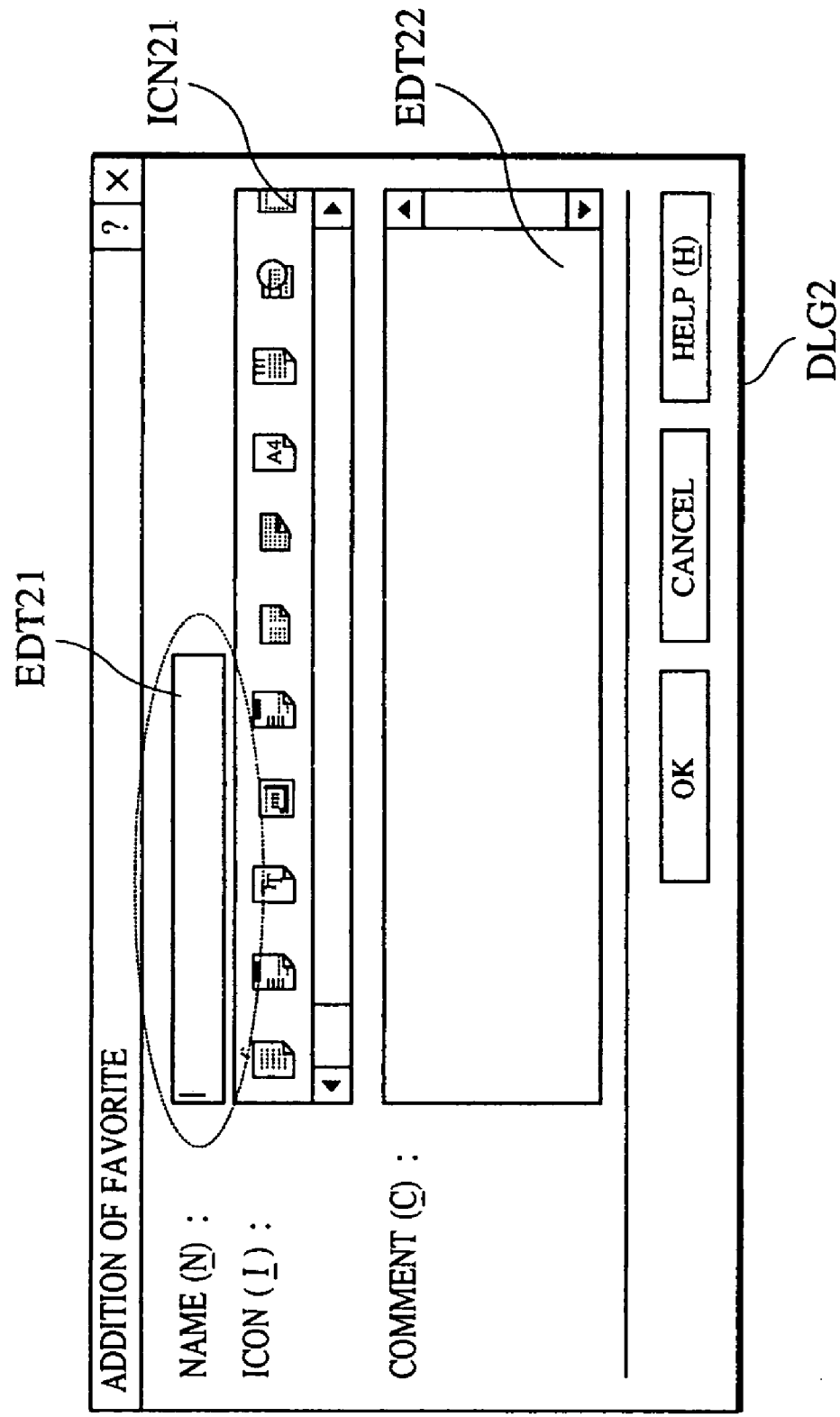
FIG. 12 is a representation showing an example of a favorite adding dialog.
Figure 13:
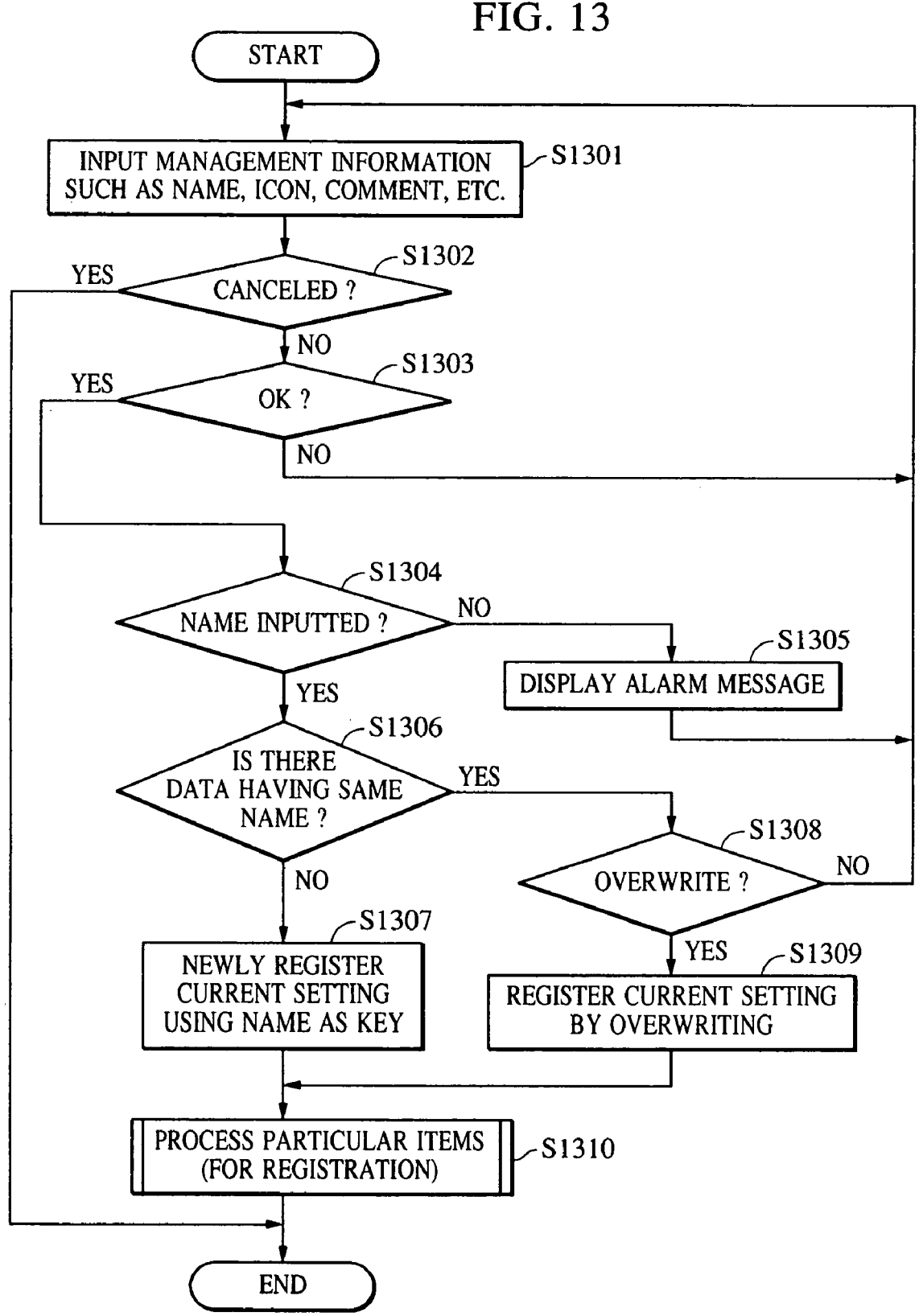
FIG. 13 is a flowchart of favorite adding processing.

A sequence of processing related to registration of the "favorite" and executed in step S406 of the flowchart shown in FIG. 4 will be described with reference to an example of the dialog shown in FIG. 12 and a flowchart shown in FIG. 13. DLG2 shown in FIG. 12 represents one example of the dialog in which management information such as a name, icon and comment can be added.

First, in step S1301, the CPU 1 receives management information such as a name, icon and comment which is input by the user through the KB 10, and stores the management information in the RAM 2. In step S1302, the CPU 1 determines whether the input information is activation of the "cancel" button shown in FIG. 12. If it is determined that the "cancel" button has been activated, then the CPU 1 brings the processing to the end without any further steps.

Figure 14:
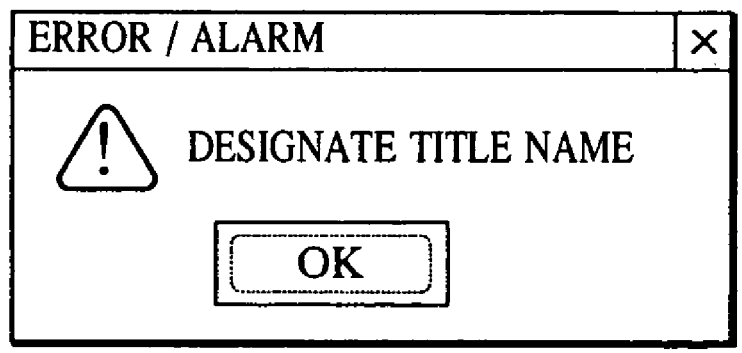
FIG. 14 is a representation showing an example of a message displayed when the name is not inputted.

If it is determined in step S1302 that the input information does not activate the "cancel" button, then the CPU 1 determines in step S1303 whether the input information is "OK". If it is determined that "OK" has been input, then the CPU 1 starts the registration processing. In step S1304, the CPU 1 checks whether a "name" has been entered in EDT21 of FIG. 12. If any "name" is not yet entered, then the CPU displays an "alarm message" as shown in FIG. 14 in step S1305 for prompting the user to enter (or designate) a "name" again, and returns the processing to step S1301. Since the "name" serves as a "key" for management of the "favorite", its entry is essential.

Figure 15:
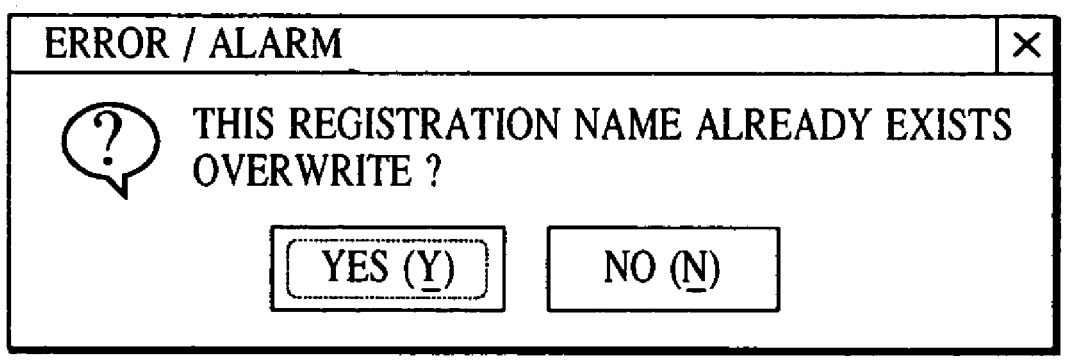
FIG. 15 is a representation showing an example of a message displayed to confirm agreement with overwrite.

If a "name" has been entered, then the CPU checks in step S1306 whether the entered name coincides with any existing data. If there is no data having the same name, then the CPU, in step S1307, newly registers the current setting in the "favorite" stored in the external memory 12 while the entered name is employed as a "key". If there exists data having the same name, the CPU displays a confirmation message for asking the user to agree with overwrite in step S1308. If the user agrees with overwrite, then the CPU replaces the existing data in the favorite DB by new data for registration in step S1309. If the user does not agree with overwrite, then the CPU returns the processing to step S1301 and receives a name input by the user again. FIG. 15 shows an example of the overwrite confirmation message.

If new data is registered in the "favorite" DB following step S1307 or S1309, then the CPU registers the current setting after modifying a part thereof in step S1310. Details of this processing will be described later. Registerable setting items are not limited to only the current page, but cover all controls on the UI including other inactive pages. Thus, the setting items which can be registered are the same regardless of from which sheet the registration is performed.

The above-described processing is continued until an "OK" or "cancel" key is depressed.

(Modification Processing of Setting)

Figure 16:
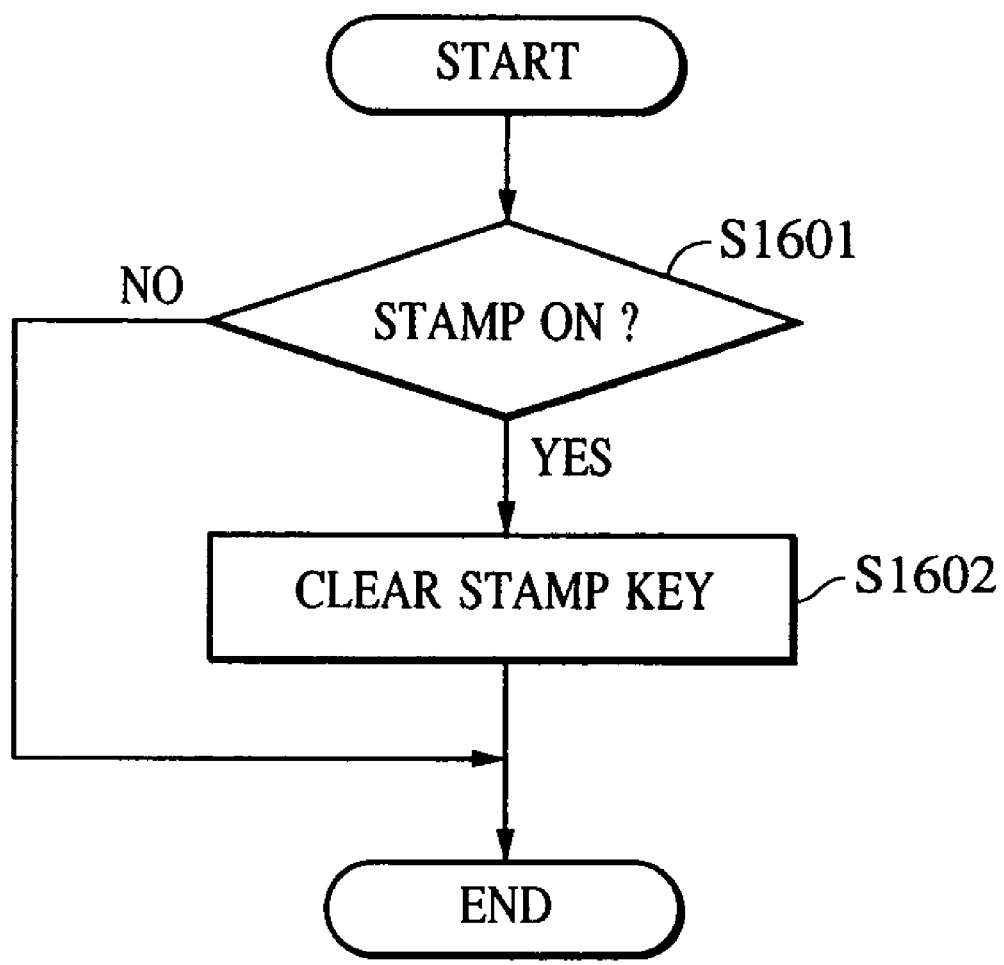
FIG. 16 is a flowchart of stamp data processing when the "favorite" is registered.

Modification processing of setting executed in step S1310 of the flowchart shown in FIG. 13 will be described with reference to a flowchart shown in FIG. 16.

In step S1601, the CPU determines whether the stamp function is turned on in the current setting. If it is determined that the current setting employs the stamp function, then the CPU clears the stamp key in step S1602. The stamp itself has a registration function, and the stamp is usually registered or called with the stamp name being used as a key. Clearing the stamp key makes it possible to start the processing described above in connection with FIG. 7.

(Edit Flowchart)

Figure 17:
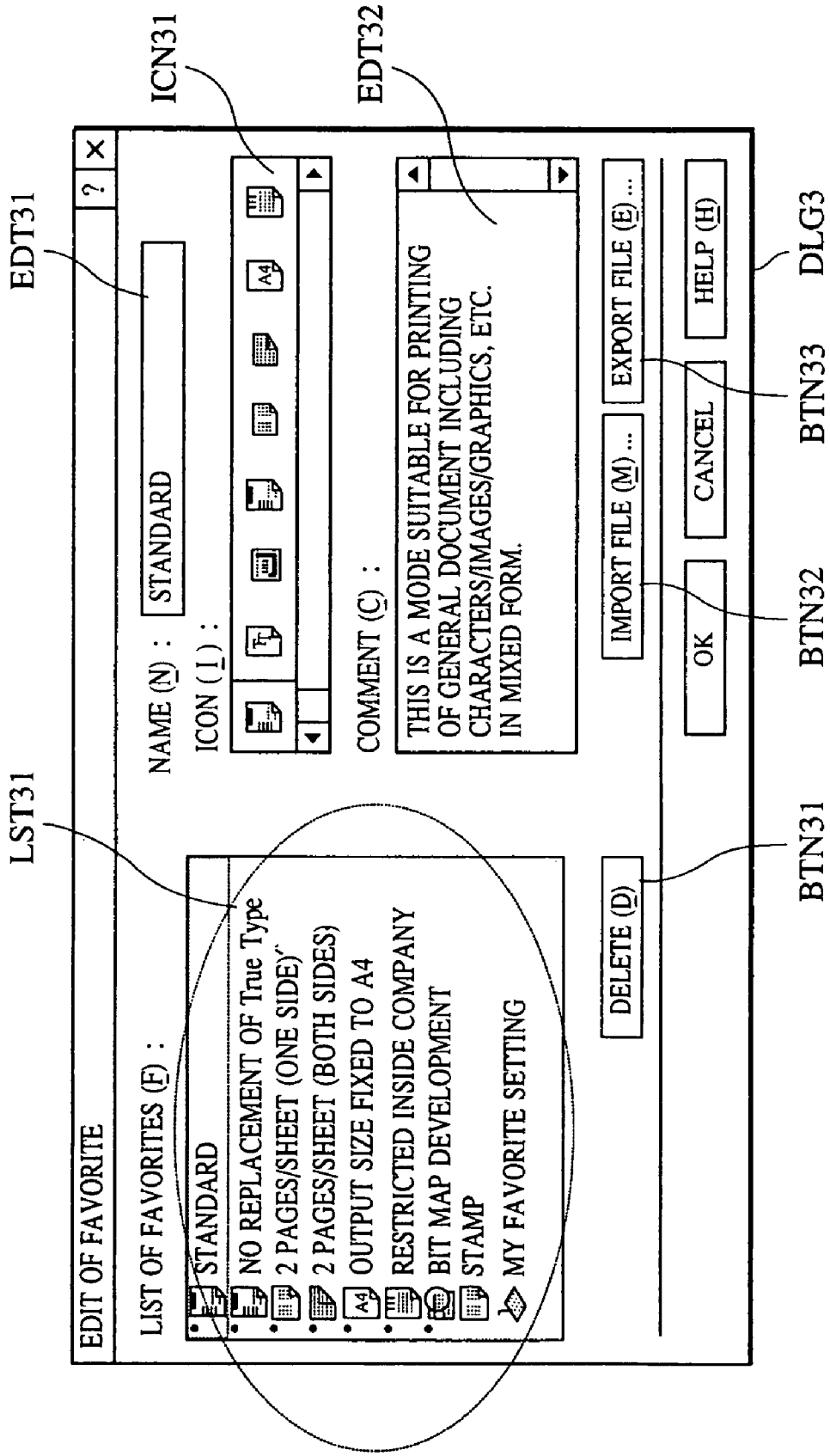
FIG. 17 is a representation showing an example of a favorite editing dialog.
Figure 18:
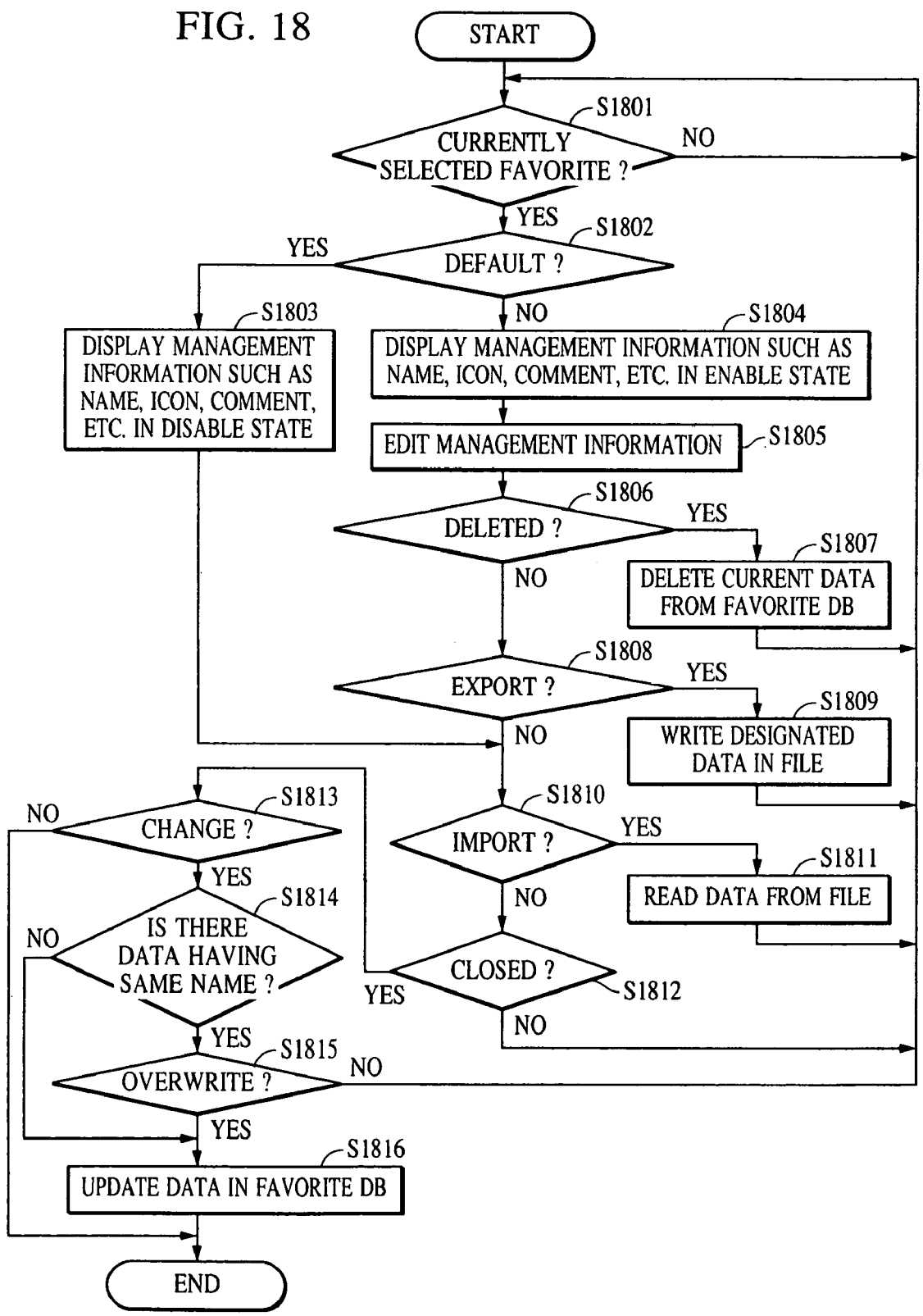
FIG. 18 is a flowchart of favorite edit processing.

A sequence of processing related to editing of the "favorite" and executed in step S409 of the flowchart shown in FIG. 4 will be described with reference to an example of the dialog shown in FIG. 17 and a flowchart shown in FIG. 18.

Figure 19:
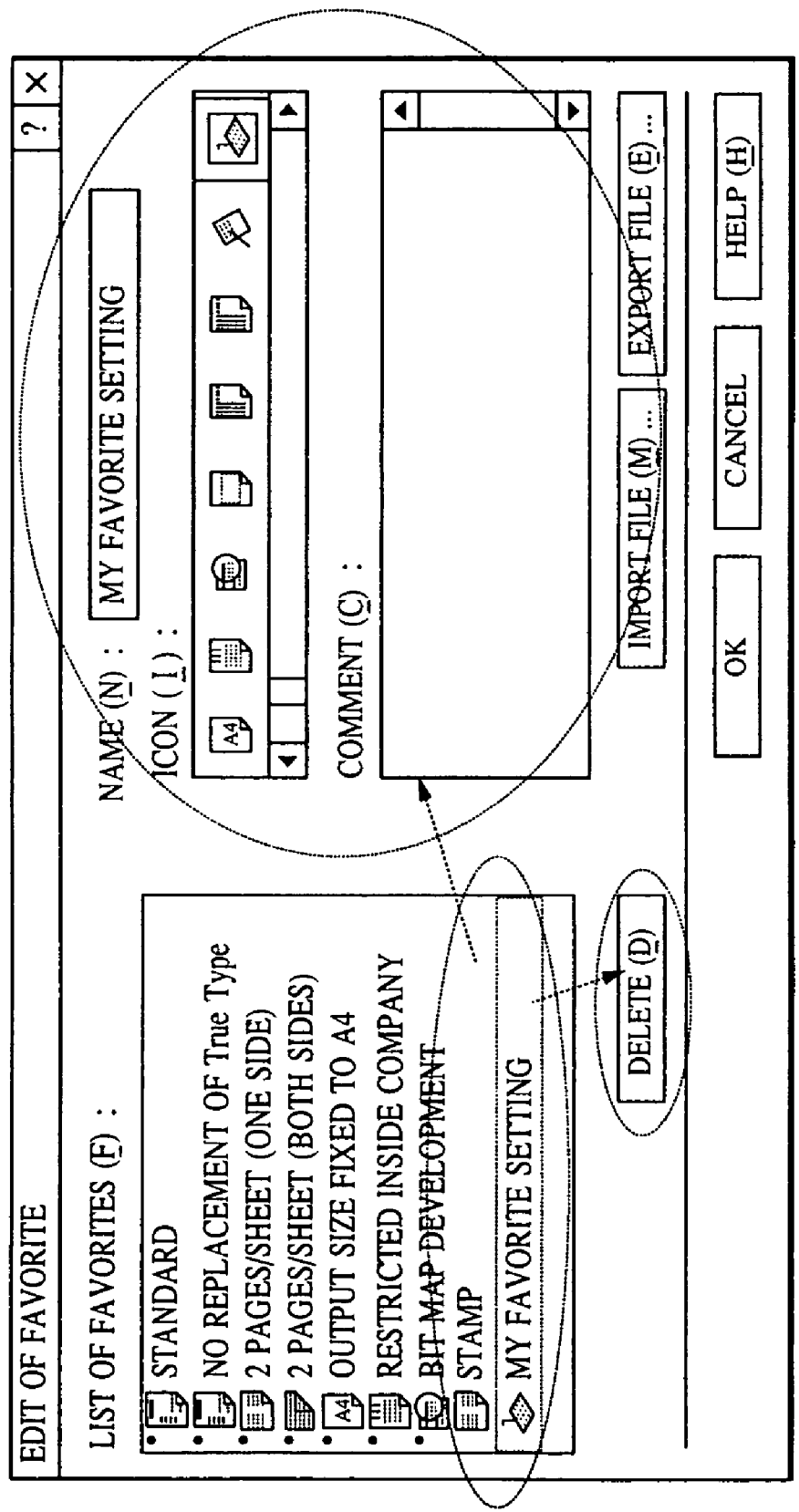
FIG. 19 is a representation showing a difference (1) between a program default and setting provided upon selection of user registration.
Figure 20:
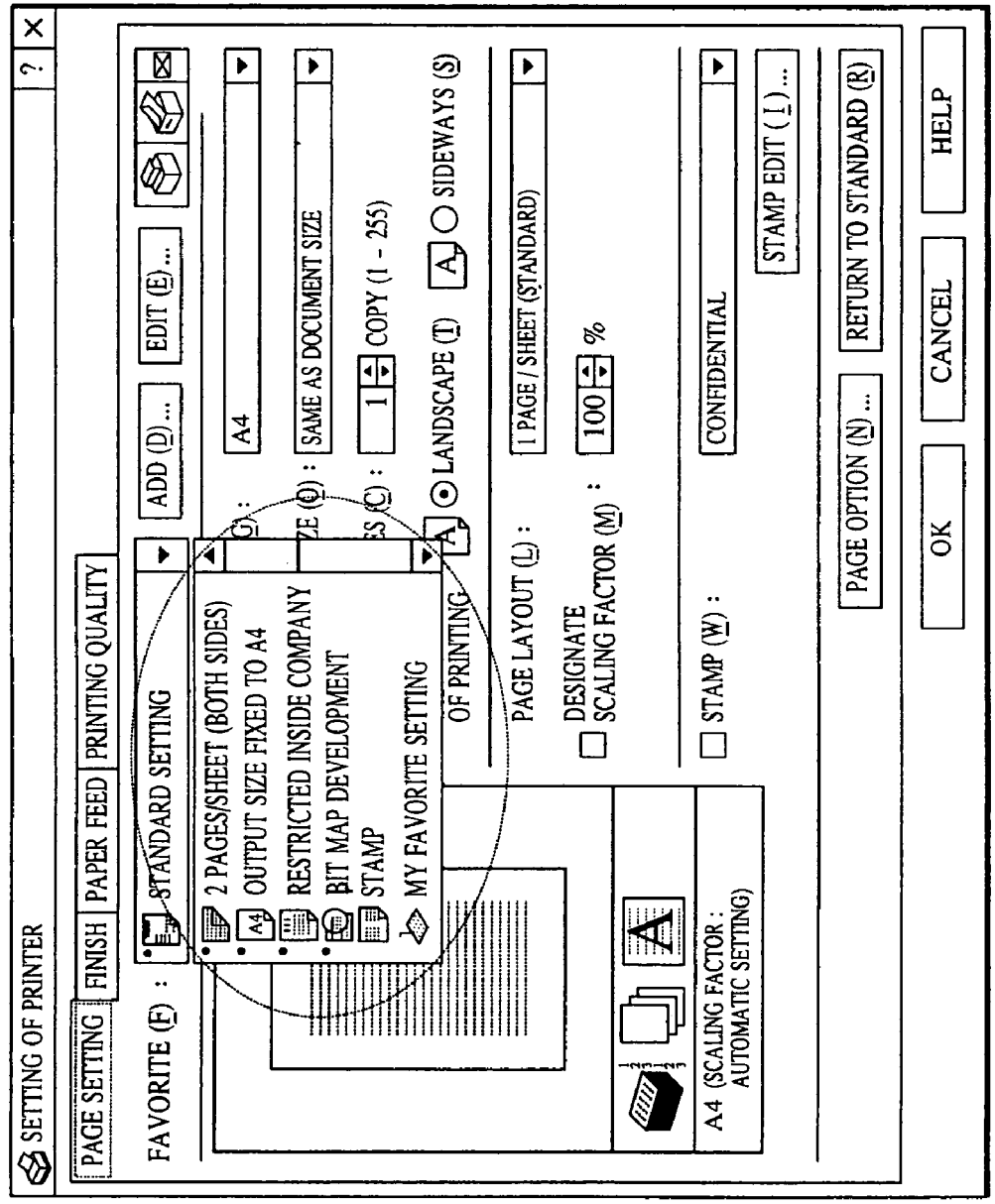
FIG. 20 is a representation showing a difference (2) between a program default and setting provided upon selection of user registration.

First, in step S1801, the CPU 1 determines whether one of the existing favorite settings is selected from a favorite list shown at LST31. The list LST31 includes the default settings prepared by the printer driver and the user settings registered by the user. If it is determined that one of the existing favorite settings is selected, then the CPU determines in step S1802 whether the currently selected "favorite" is the default setting. If it is determined that the currently selected "favorite" is the default setting, then the CPU disables a management information control, a delete button, etc. in step S1803 so that the user cannot edit the setting. If it is determined that the currently selected "favorite" is the user setting, then the CPU enables all controls in step S1804, and displays the management information (such as the name, icon and comment) assigned to the user favorite setting on the CRT 11. FIG. 17 shows an example of the UI dialog displayed when the default setting is selected, and FIG. 19 shows an example of the UI dialog displayed when the user setting is selected. Respective icons of the default settings and the user settings are marked with dots so that the user can recognize separation between both the settings upon seeing them. Such a separation is also applied to the dialog for selecting the favorite setting (FIG. 20).

Figure 21:
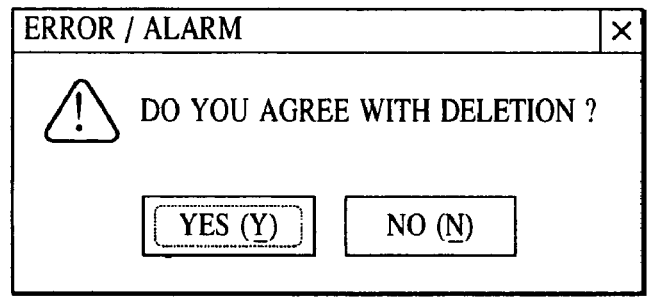
FIG. 21 is a representation showing an example of a message displayed to confirm agreement with deletion.

If the user setting is selected, then the CPU 1 executes editing of the management information in step S1805. In step S1806, the CPU 1 determines whether the delete button BTN31 has been depressed. If the delete button BTN31 has been depressed, then the CPU 1 deletes the currently selected option from the favorite DB in step S1807 after displaying a confirmation message for asking the user to agree with deletion (FIG. 21 shows an example of the message).

If the delete button BTN31 has not been depressed, then the CPU 1 determines in step S1808 whether a file save button BTN33 has been depressed. If it is determined that the file save button BTN33 has been depressed, then the CPU 1 saves the setting of the current setting items into a file and stores the file in the external memory 12 in step S1809 so that the file can be exported to another client.

If the file save button BTN33 has been depressed, then the CPU 1 determines in step S1810 whether a file read button BTN32 has been depressed. If it is determined that the file read button BTN32 has been depressed, then the CPU 1 executes import processing in step S1811 by loading the combined setting "favorite", which is saved in the file and stored in the external memory 12, for addition to the favorite DB.

If the file read button BTN32 has not been depressed, then the CPU 1 determines in step S1812 whether the dialog has been closed. If the dialog has not been closed, then the CPU 1 determines in step S1813 whether the setting has been changed. If the setting has been changed, then the CPU 1 executes processing of leaving the changed setting in the favorite DB stored in the external memory 12. If the setting has been changed and it is determined in step S1814 that the designated name is the same as any of the other existing settings, then the CPU 1 confirms in step S1815 whether the user agrees with overwrite. If the user agrees with overwrite, then the CPU 1 replaces the existing data by the new data for registration in step S1816, and if the user does not agree with overwrite, then the CPU 1 returns to step S1801 to receive an input for setting selection again. If there is no data having the same name in step S1814, then the CPU 1 registers the data under editing by updating the favorite DB in step S1816.

With the first embodiment of the present invention, as described above, all setting items which can be set by a printer driver are made able to be registered in printer setting so that new registration and selection of registered icons can be performed from any of all setting sheets and items in all the sheets can be changed together in one package. It is therefore possible to perform registration and package change of a multi-combination including a paper size, a paper feed slit, etc., to achieve a system adaptable for various needs, and to make new registration and selection of registered icons from any of all the sheets. As a result, operability of the information processing apparatus in use is improved.

Further, when the global registration is made which contains, as an attribute, a function capable of changing the setting thereof as with the "stamp", butting between the contents of different settings is avoided by adding a temporary option in which the contents of the setting registered in the global registration for printing setting can be temporarily employed. This point can be summarized as follows.

When the global registration is made in a condition utilizing the "stamp" and an icon representing the "stamp" is selected, "<not registered stamp>" is added as another stamp option and the stamp setting registered in the global registration is assigned to the added option. In this case, accordingly, there are two stamp options; i.e., the existing one and the "<not registered stamp>". When the existing option is selected, the setting in the stamp DB becomes effective, and when the "<not registered stamp>" is selected, the setting registered in the global registration becomes effective. To realize such a choice, a stamp key is cleared at the time of making the global registration.

In other words, if there is a stamp key (stamp name in practice), the setting in the stamp DB is used, and if there is no stamp key, the "<not registered stamp>" (i.e., the stamp setting in the "favorite" is used. This enables both the settings to be separately used in a proper manner even with a difference therebetween.

When the global registration not having the stamp attribute (with the "stamp" turned off) is selected, the "<not registered stamp>" is not displayed as the stamp option. Thus the "<not registered stamp>" is a temporary option for employing the attributes of the global registration.

The Second Embodiment

Figure 22:
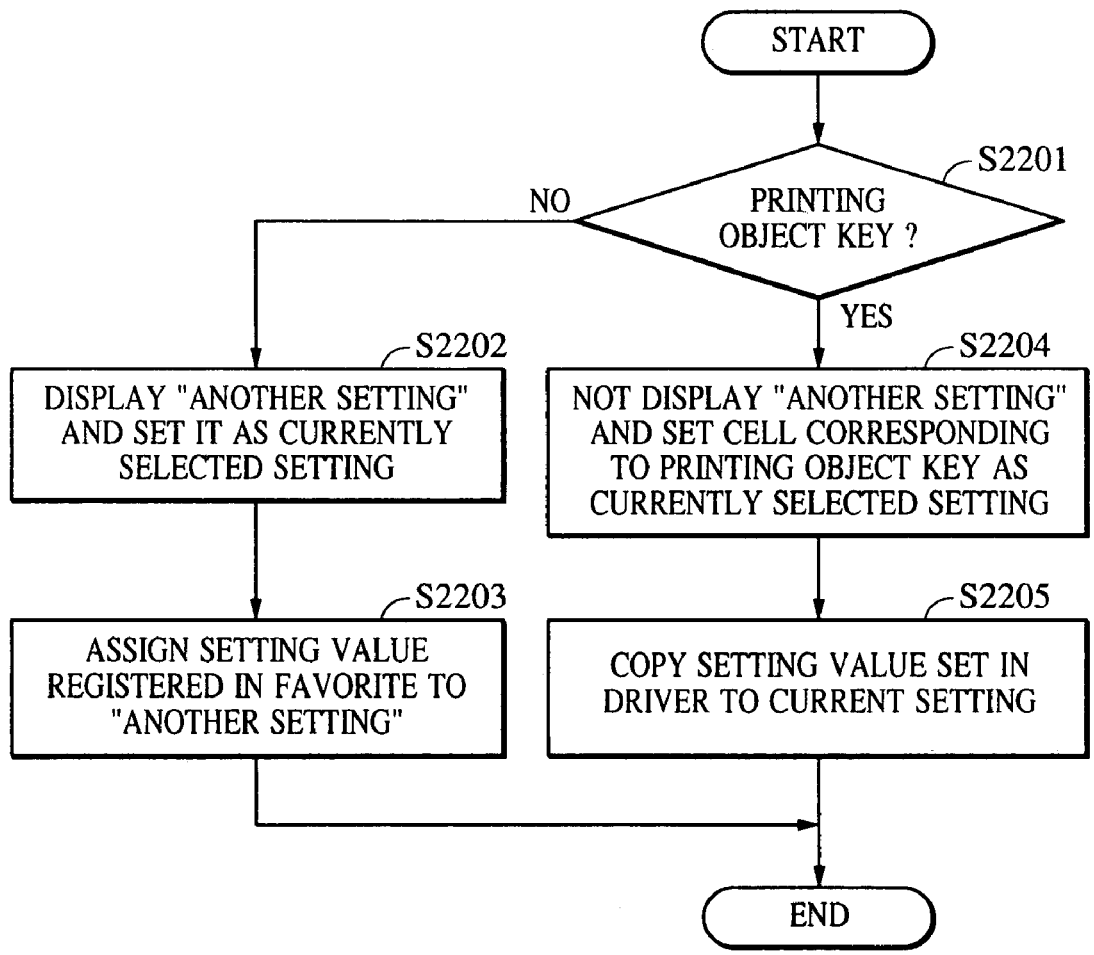
FIG. 22 is a flowchart of printing-object conflict processing when the "favorite" is selected.
Figure 23:
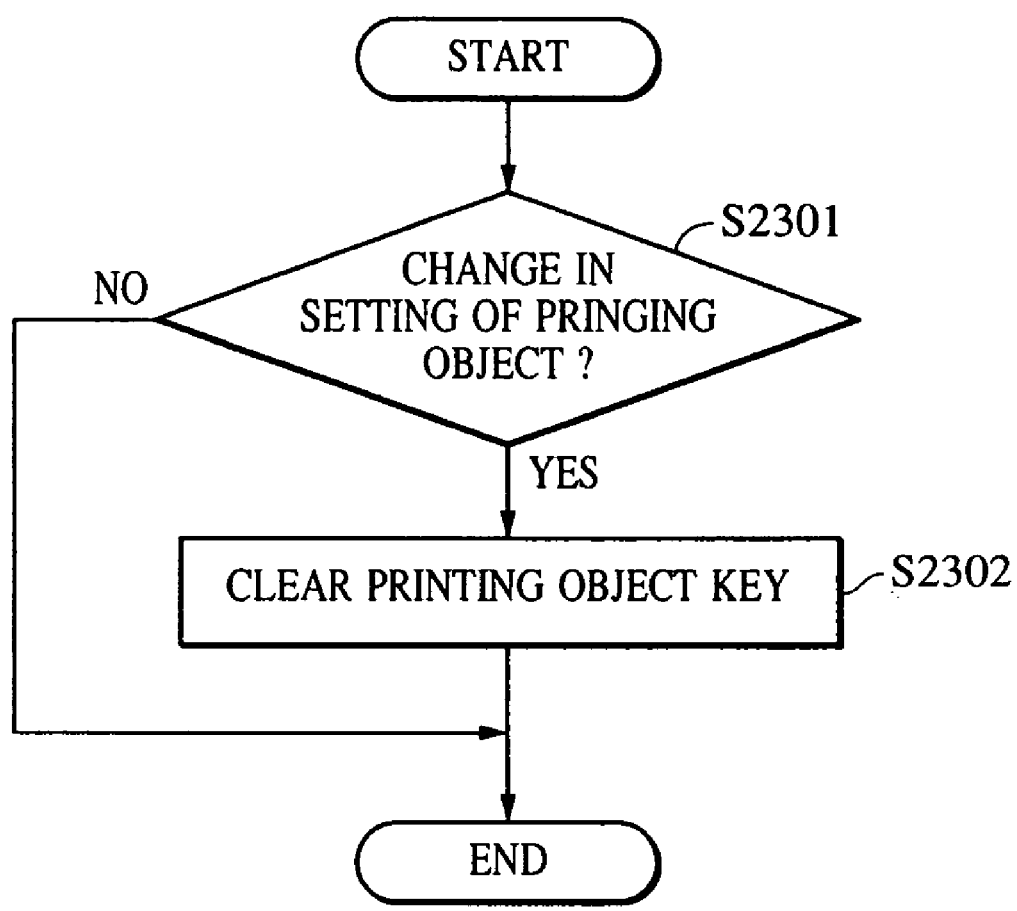
FIG. 23 is a flowchart of printing-object data processing when the "favorite" is registered.

While the first embodiment has been described with respect to the stamp processing executed in step S403 of FIG. 4 and step S1310 of FIG. 13, similar processing for the printing object will be described below with reference to FIGS. 22 and 23.

(Conflict Processing)

The conflict processing executed in step S403 of the flowchart shown in FIG. 4 will be described with reference to a flowchart shown in FIG. 22.

First, in step S2201, the CPU 1 checks whether there is any "key" of the printing object. If there is no "key" of the printing object, then the CPU adds an option "another setting", for example, to a printing object list and sets the option to a current printing object in step S2201. This option is intended to employ the setting of the printing object registered in the "favorite". Further, in step S2203, the CPU assigns the contents of the printing object setting to the added option so that the setting registered in the "favorite" is employed when the added option is selected later.

If it is determined in step S2201 that there is a printing object key, then the CPU 1 does not add the option "another setting" to the printing object list and sets the printing object corresponding to the "key" to a current stamp in step S2204. In this case, the setting prepared in a printer driver beforehand is employed, and the contents of the registration setting become optimum for the model. Such processing for separate use of the "another setting" and the default setting is meaningful particularly when the setting once exported to a file is utilized in another model again. Thereafter, in step S2205, the CPU 1 copies setting values stored in the printer driver to the current setting in step S2205.

Figure 24:
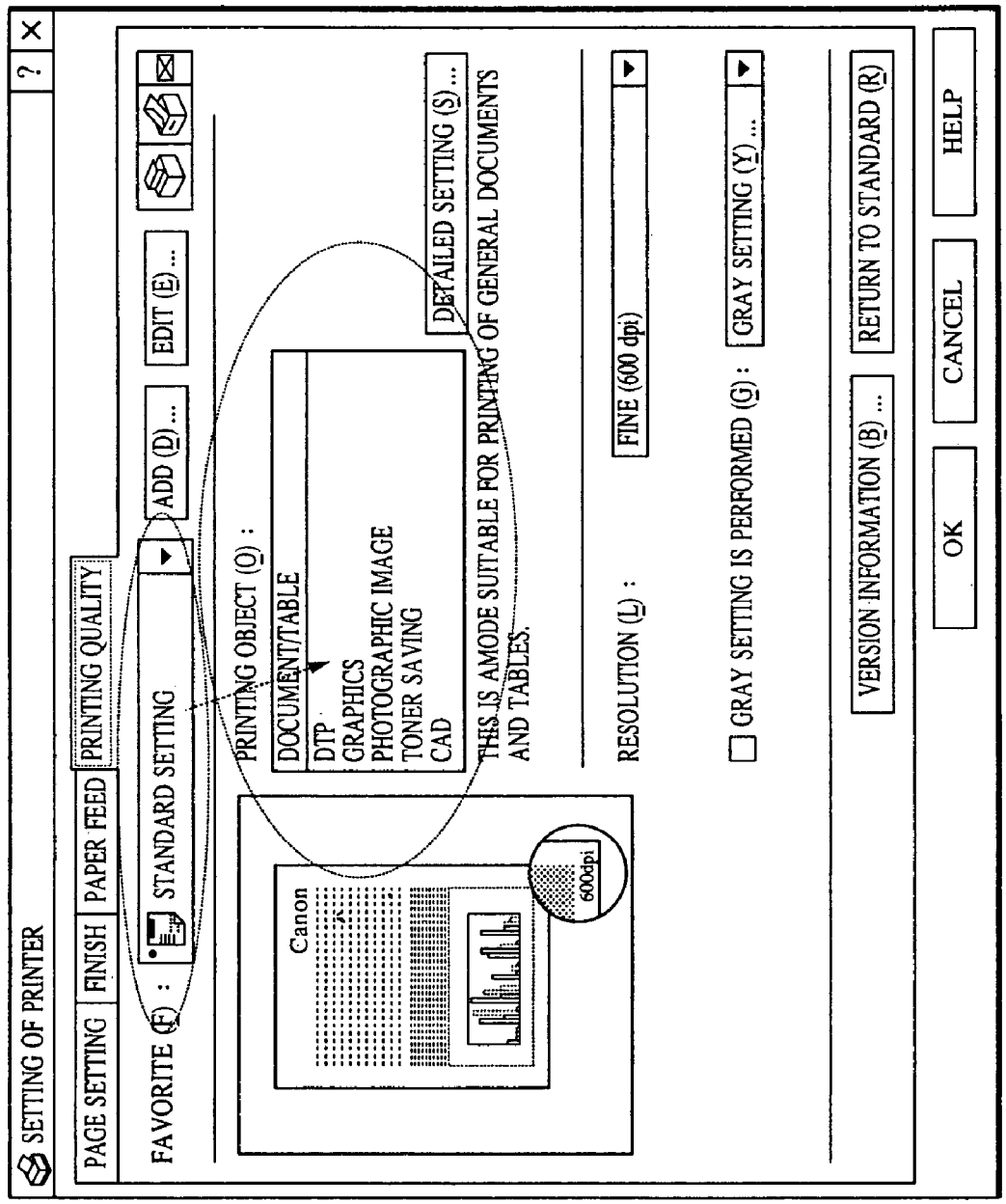
FIG. 24 is a representation showing an example in which "another setting" is not displayed.
Figure 25:
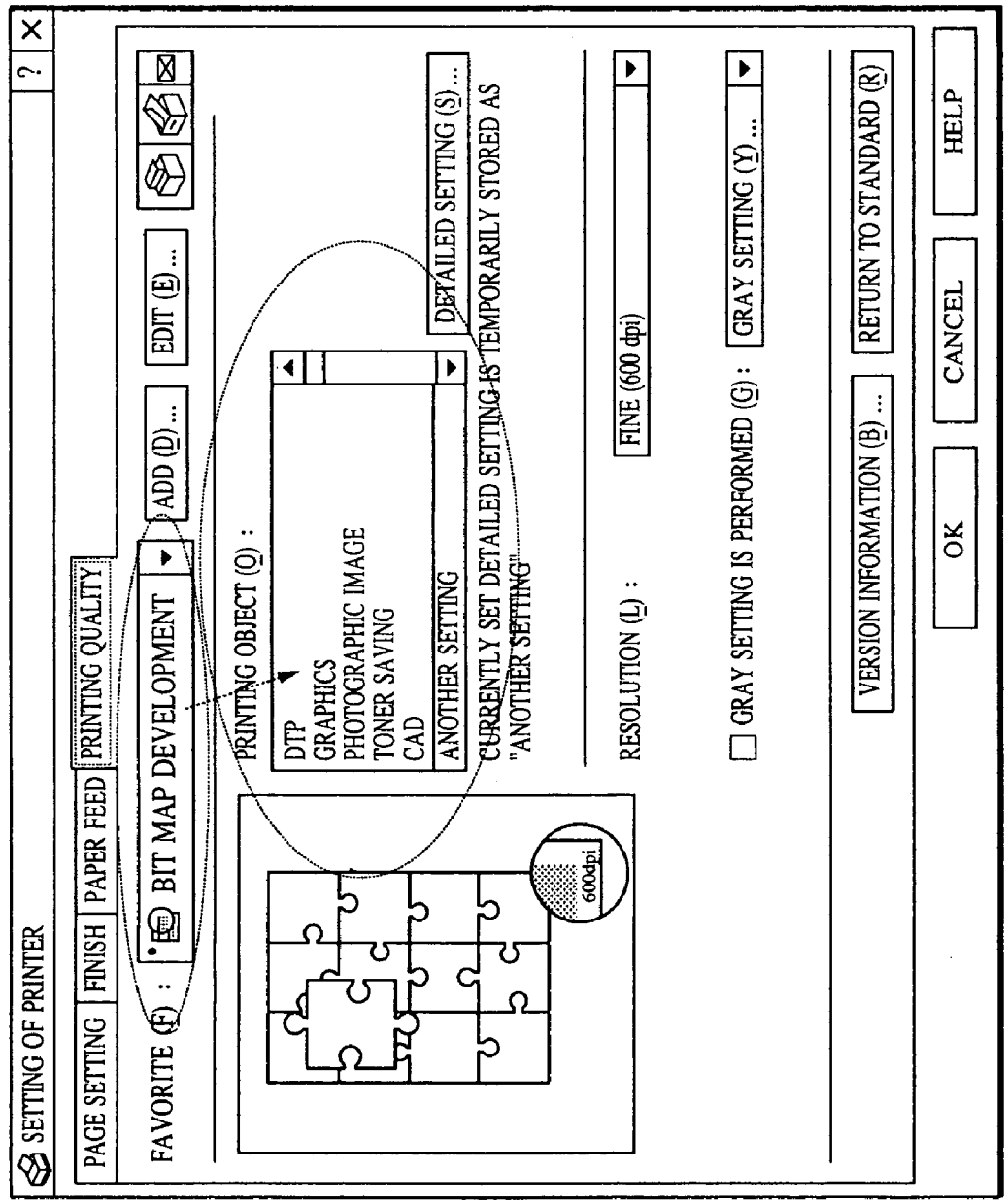
FIG. 25 is a representation showing an example in which "another setting" is displayed.

FIG. 24 shows an example of the UI dialog displayed when the "favorite" with the default setting registered therein is selected. FIG. 25 shows an example of the UI dialog displayed when the "favorite" with the custom setting registered therein is selected.

(Modification Processing of Setting)

Modification processing of setting executed in step S1310 of the flowchart shown in FIG. 13 will be described with reference to a flowchart shown in FIG. 23.

Figure 26:
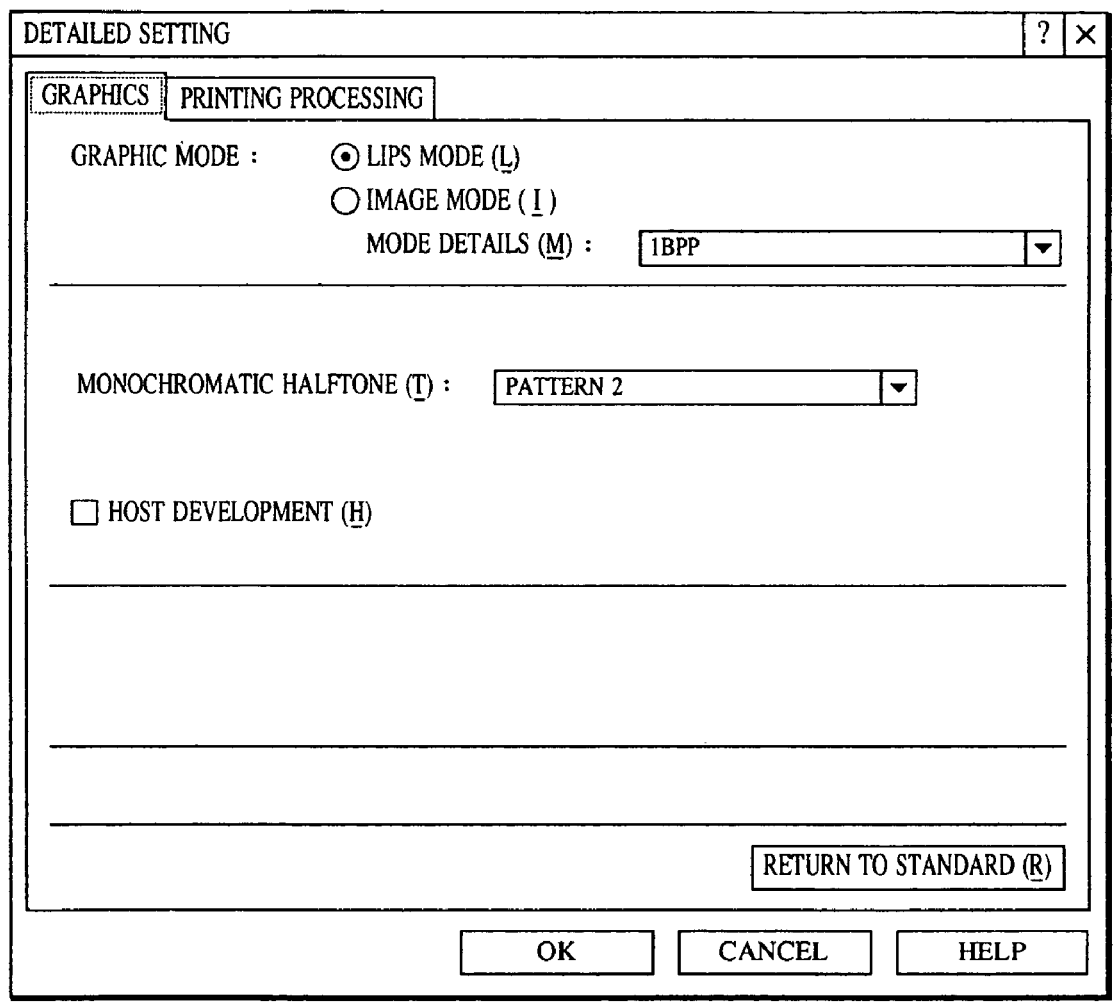
FIG. 26 is a representation showing detailed setting (1) of the printing object.
Figure 27:
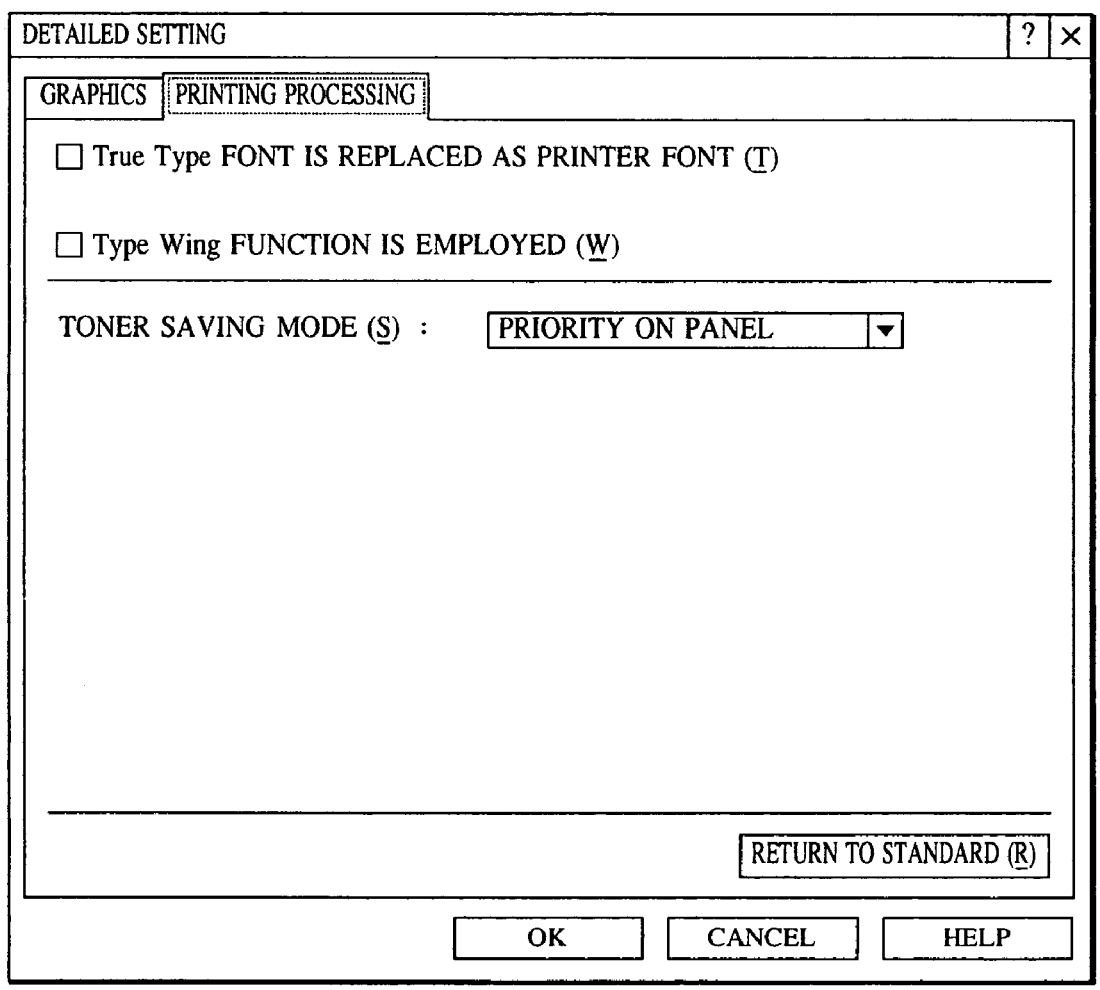
FIG. 27 is a representation showing detailed setting (2) of the printing object.
Figure 28:
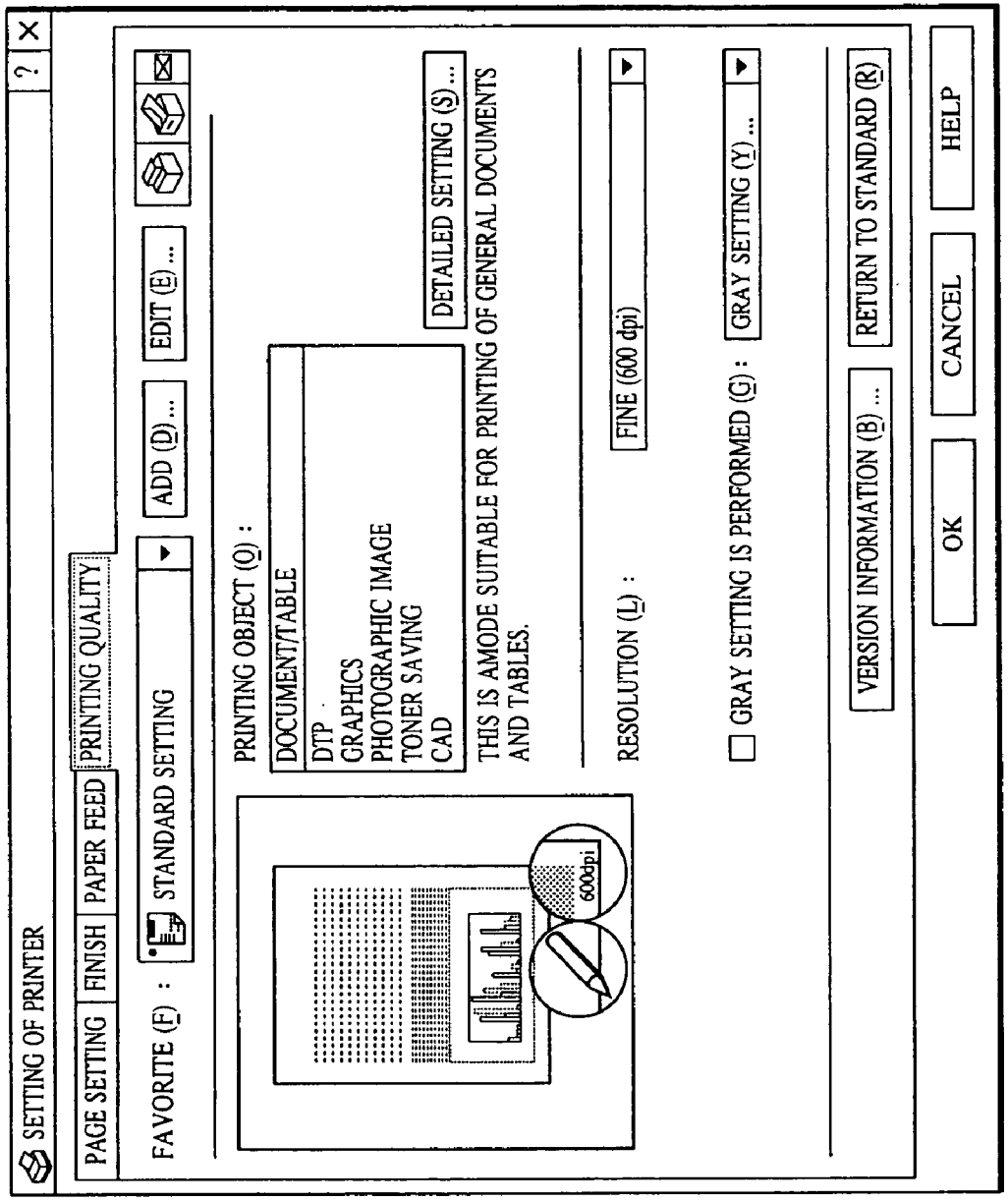
FIG. 28 is a representation showing a screen image when the detailed setting of the printing object is changed.

FIGS. 26 and 27 each show an example of the UI dialog box which is opened to change the detailed setting of the printing object. If the detailed setting is changed, a custom mark indicating setting change is displayed in the dialog box as shown in FIG. 28.

In step S2301, the CPU 1 determines whether the detailed setting of the printing object is changed. If it is determined that the detailed setting of the printing object is changed, then the CPU 1 clears the printing object key in step S2302. Clearing the printing object key makes it possible to start the processing described above in connection with FIG. 22.

With the second embodiment of the present invention, as described above, when the global registration is performed by selecting one existing option of the printing object, the printing object attribute is displayed as an option key. Upon choice of the global registration performed in that way, the printing object having been selected at the time of registration becomes a current option. On the other hand, when a user performs the global registration with addition of change to detailed setting, the option key is cleared based on a judgement that the user desires the setting changed by himself. Upon choice of the global registration not having the printing object key, "another setting" is added to the printing object and becomes a current option. The detailed setting registered at the time of making the global registration is assigned to that current option.

Such an operation is meaningful in that particularly when the setting is exported to another model of printer driver.

The processing described above in connection with the first and second embodiments is executed primarily by the CPU 1, and control programs for the processing can be provided in the form of an external memory card. Therefore, the processing executed in the present invention can also be achieved by supplying, to a system or apparatus, a storage medium which stores program codes of a printer driver for realizing the functions of any of the above-described embodiments, and by causing a computer (or CPU and/or MPU) in the system or apparatus to read and execute the program codes stored in the storage medium.

In such a case, the program codes read out of the storage medium serve in themselves to realize the functions of any of the above-described embodiments, and therefore the storage medium storing the program codes comprises the present invention. FIG. 29 shows a memory map of a storage medium in which program codes for the processing executed in the present invention are stored.

Storage mediums for use in supplying the program codes may be, e.g., floppy disks, hard disks, optical disks, magneto-optic disks, CD-ROMs, CD-Rs, magnetic tapes, non-volatile memory cards, ROMS, and DVDS.

As a matter of course, the functions of any of the above-described embodiments are realized not only by a computer reading and executing the program codes by itself, but also an OS (Operating System) or the like which is working on the computer and executes a part or the whole of the actual processing to realize the functions in accordance with instructions from the program codes.

Further, the present invention also involves such a case where the program codes read out of the storage medium are written into a memory provided in a function add-on board mounted in the computer or a function add-on unit connected to the computer, and a CPU or the like incorporated in the function add-on board or unit executes a part or the whole of the actual processing in accordance with instructions from the program codes, thereby realizing the function of any of the above-described embodiments.

Moreover, the programs codes installed in a computer for realizing the functions and processing of the present invention with the computer should be construed as realizing the present invention by themselves. In other words, the claims of the present invention contain a computer program itself for realizing the functions and processing of the present invention.

The computer program can be supplied, as described above, by a method of storing the computer program in an FD or CD-ROM and rendering a computer to read the computer program for installation into the computer. In addition, the computer program may be supplied by connecting a client computer to a home page on the Internet with a browser installed in the computer, and downloading the computer program itself of the present invention or a file in the compressed form of the computer program including an automatic installing function from the home page. Further, supply of the computer program may also be realized by dividing program codes, which constitute the computer program of the present invention, into a plurality of files, and downloading those files from different home pages. In other words, the claims of the present invention further contain WWW servers from which one or more program files for realizing the functions and processing of the present invention are downloaded to a plurality of users.

The computer program of the present invention may be stored in a storage medium such as an FD in the encrypted form and distributed to users. In this case, those users who cleared predetermined qualifications are allowed to download key information for decrypting the encrypted program from a home page via the Internet, and the encrypted program is run using the key information for installation into a computer to realize the functions and processing of the present invention.

According to the present invention, as described above, all setting items can be simply changed in one action by utilizing an icon in which a plurality of printing items for a printer driver are registered. For example, the contents of all setting sheets can be returned to those of the standard setting. Another merit is that setting items in all the sheets can be changed by applying an action to only the first sheet. Since all the sheets have common controls and can be operated in the same manner, package change of all the setting items can be performed from any of the sheets.

Further, one of functions which has a registration function from which setting items are usually selected, such as a function "stamp", is often registered in "favorite" setting and then employed. In such a case, if a stamp DB is changed after the registration, there occurs a difference between the contents of the registered setting and the contents of the changed setting. Hence, which setting should be selected with priority is not clear to a system.

With the present invention, therefore, the above problem is solved by providing a temporary option and assigning the contents of setting to the temporary option when the "stamp" registered in the "favorite" is used. Stated otherwise, when the setting duly registered in the stamp DB is to be employed, the setting is selected by using its registered name as usual, and when the setting registered in the "favorite" is to be employed, the temporary option is selected.

Additionally, a printer driver is adaptable for a plurality of models, and some functions of the printer driver, such as items of printing quality, have the same options for all the models, but have different attributes (contents of detailed setting) between the models (the attributes being set in respective optimum combinations depending on the models). When such a function is employed after changing its default setting, it is usual to put custom marks on items of the default setting so that the base setting can be recognized. However, when the above function is registered in the "favorite" and then exported to another model for use therein, display of the base is meaningless because the default setting providing the base being is itself different between the models. With the present invention, the above problem can be solved by providing a dedicated option and assigning the setting to the dedicated option in the case of using the "favorite" which has been registered after changing the printing object.

While the present invention has been described with respect to what are presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. An information processing apparatus for producing printing data, which is interpretable by a printer, based on document data produced by an application, comprising:
    combined setting registration means for combining each value of a plurality of setting items into a combined setting to produce the printing data and for registering the combined setting by name in a combined setting list, wherein setting of the setting items is performed via a setting sheet;
    selection means for selecting one of the combined settings registered in said combined setting list by designating a name of one of the combined settings;
    display control means for controlling display of each value of the plurality of the setting items of one combined setting in the setting sheet when the one combined setting is selected by said selection means;
    item setting registration means for registering a setting value of a predetermined setting item of the plurality of setting items registered by said combined setting registration means by name in an item setting list; and
    addition means for, when the combined setting selected by said selecting means includes the setting value of the predetermined setting item registered by said item setting registration, adding a temporary option to the item setting list and for assigning the temporary option to the setting value of the predetermined setting item included in the combined setting so that the combined setting temporarily utilizes the setting value of the predetermined setting item.

2. An information processing apparatus according to claim 1, further comprising:
    input means for inputting a name of the combined setting, wherein said combined setting registration means registers the combined setting in association with the name inputted by said input means.

3. An information processing apparatus according to claim 1, wherein the combined setting can be registered by said combined setting registration means from the plurality of setting sheets.

4. An information processing apparatus according to claim 1, wherein said printer is controlled by a printer driver which includes said combined setting registration means.

5. An information processing apparatus according to claim 1, further comprising changing means for, in case of changing one value of the setting items via the setting sheet, changing the displayed name of the combined setting list so as to inform the user that the changed value is different from the value of the setting items associated with the name of the combined settings.

6. An information processing apparatus according to claim 1, further comprising determining means for, when the setting value of the predetermined setting item of the combined setting is set at a time when the combined setting is registered by said combined setting registration means, determining whether the predetermined setting item is already registered in the item setting list,
    wherein when the determining means determines that the predetermined setting item is not registered in the item setting list, said addition means adds the temporary option to the item setting list and assigns the temporary option to the setting value of the predetermined setting value of the predetermined setting item included in the combined setting.

7. An information processing apparatus according to claim 6, wherein the setting item having a registration function is a stamp setting for adding a stamp to the document data.

8. An information processing method for producing printing data, which is interpretable by a printer, based on document data produced by an application, comprising the steps of:
    a combined setting registration step for combining each value of a plurality of setting items into a combined setting to produce the printing data and for registering the combined setting by name in a combined setting list, wherein setting of the setting items is performed via a setting sheet;
    a selection step for selecting one of the combined settings registered in said combined setting list by designating a name of one of the combined settings;
    a display control step for controlling display of each value of the plurality of the setting items of one combined setting in the setting sheet when the one combined setting is selected in said selection step;
    a item setting registration step for registering a setting value of a predetermined setting item of the plurality of setting items registered in said combined setting registration step by name in an item setting list; and an addition step for, when the combined setting selected in said selecting step includes the setting value of the predetermined setting item registered by said item setting registration, adding a temporary option to the item setting list and for assigning the temporary option to the setting value of the predetermined setting item included in the combined setting so that the combined setting temporarily utilizes the setting value of the predetermined setting item.

9. An information processing method according to claim 8, further comprising:

an input step for inputting a name of the combined setting, wherein said combined setting registration step registers the combined setting in association with the name input in said input step.

10. An information processing method according to claim 8, wherein the combined setting can be registered in said combined setting registration step from the plurality of setting sheets.

11. An information processing method according to claim 8, wherein said combined setting registration step is included in a printing setting step executed by a printer driver of an information processing apparatus.

12. An information processing method according to claim 8, further comprising a changing step for, in case of changing one value of the setting items via the setting sheet, changing the displayed name of the combined setting list so as to inform the user that the changed value is different from the value of the setting items associated with the name of the combined settings.

13. An information processing method according to claim 8, further comprising determining means for, when the setting value of the predetermined setting item of the combined setting is set at a time when the combined setting is registered by said combined setting registration means, determining whether the predetermined setting item is already registered in the item setting list, wherein when the determining means determines that the predetermined setting item is not registered in the item setting list, said addition means adds the temporary option to the item setting list and assigns the temporary option to the setting value of the predetermined setting value of the predetermined setting item included in the combined setting.

14. An information processing method according to claim 13, wherein the setting item having a registration function is a stamp setting for adding a stamp to the document data.

15. A computer-readable storage medium storing a computer-executable printer driver program for producing printing data, which is interpretable by a printer, based on document data produced by an application, said printer driver program comprising the steps of:

a combined setting registration step for combining each value of a plurality of setting items into a combined setting to produce the printing data and for registering the combined setting by name in a combined setting list, wherein setting of the setting items is performed via a setting sheet;

a selection step for selecting one of the combined settings registered in the combined setting list by designating a name of one of the combined settings;

a display control step for controlling display of each value of the plurality of the setting items of one combined setting in the setting sheet when the one combined setting is selected in said selection step;

an item setting registration step for registering a setting value of a predetermined setting item of the plurality of setting items registered in said combined setting registration step by name in an item setting list; and an addition step for, when the combined setting selected in said selecting step includes the setting value of the predetermined setting item registered by said item setting registration, adding a temporary option to the item setting list and for assigning the temporary option to the setting value of the predetermined setting item included in the combined setting so that the combined setting temporarily utilizes the setting value of the predetermined setting item.

16. A storage medium according to claim 15, wherein said printer driver program further comprises:

an input step for inputting a name of the combined setting, wherein said combined setting registration step registers the combined setting in association with the name input in said input step.

17. A storage medium according to claim 15, wherein the combined setting can be registered in said combined setting registration step from the plurality of setting sheets.

18. A storage medium according to claim 15, wherein said combined setting registration step is included in a printing setting step executed by a printer driver of an information processing apparatus.

19. A storage medium according to claim 15, further comprising a changing step for, in case of changing one value of the setting items via the setting sheet, changing the displayed name of the combined setting list so as to inform the user that the changed value is different from the value of the setting items associated with the name of the combined settings.

20. A storage medium according to claim 15, wherein said printer driver program further comprises a determining step for, when the setting value of the predetermined setting item of the combined setting is set at a time when the combined setting is registered by said combined setting registration step, determining whether the predetermined setting item is already registered in the item setting list, wherein when the determining step determines that the predetermined setting item is not registered in the item setting list, said addition step adds the temporary option to the item setting list and assigns the temporary option to the setting value of the predetermined setting value of the predetermined setting item included in the combined setting.

21. A storage medium according to claim 20, wherein the setting item having a registration function is a stamp setting for adding a stamp to the document data.

22. Computer-executable program code stored on a computer readable medium for producing printing data, which is interpretable by a printer, based on document data produced by an application, said computer-executable program code comprising:

a combined setting registration program code for combining each value of a plurality of setting items into a combined setting to produce the printing data and for registering the combined setting by name in a combined setting list, wherein setting of the setting items is performed via a setting sheet;

a selection program code for causing a user to select one of the combined settings registered in the combined setting list by designating a name of one of the combined settings;

a display control program code for controlling display of each value of the plurality of the setting items of one combined setting in the setting sheet when the one combined setting is selected;

an item setting registration program code for registering a setting value of a predetermined setting item of the plurality of setting items registered by said combined setting registration code by name in an item setting list; and an addition program code for, when the combined setting selected by said selecting code includes the setting value of the predetermined setting item registered by said item setting registration, adding a temporary option to the item setting list and for assigning the temporary option to the setting value of the predetermined setting item included in the combined setting so that the combined setting temporarily utilizes the setting value of the predetermined setting item.

23. Computer-executable program code stored on a computer readable medium according to claim 22, wherein said computer-executable program code further comprises:

an input program code for inputting a name of the combined setting, wherein said combined setting registration program code registers the combined setting in association with the name input by said input program code.

24. Computer-executable program code stored on a computer readable medium according to claim 22, wherein the combined setting can be registered by said combined setting registration program code from the plurality of setting sheets.

25. Computer-executable program code stored on a computer readable medium according to claim 22, wherein said combined setting registration program code is included in a printing setting program code executed by a printer driver of an information processing apparatus.

26. Computer-executable program code stored on a computer readable medium according to claim 22, further comprising a changing program code for, in case of changing one value of the setting items via the setting sheet, changing the displayed name of the combined setting list so as to inform the user that the changed value is different from the value of the setting items associated with the name of the combined settings.

27. Computer-executable program code stored on a computer readable medium according to claim 22, wherein said computer-executable program code further comprises a determining program code for, when the setting value of the predetermined setting item of the combined setting is set at a time when the combined setting is registered by said combined setting registration code, determining whether the predetermined setting item is already registered in the item setting list, wherein when the determining means determines that the predetermined setting item is not registered in the item setting list, said addition means adds the temporary option to the item setting list and assigns the temporary option to the setting value of the predetermined setting value of the predetermined setting item included in the combined setting.

28. Computer-executable program code stored on a computer readable medium according to claim 27, wherein the setting item having a registration function is a stamp setting for adding a stamp to the document data.

\* \* \* \* \*

UNITED STATES PATENT AND TRADEMARK OFFICE
CERTIFICATE OF CORRECTION

| | | |
|---|---|---|
| PATENT NO. | : 7,057,747 B1 | |
| APPLICATION NO. | : 09/492336 | |
| DATED | : June 6, 2006 | |
| INVENTOR(S) | : Tomonori Minagawa | |

It is certified that error appears in the above-identified patent and that said Letters Patent is hereby corrected as shown below:

COVER PAGE:
(30) Foreign Application Priority Data
"Jan. 29, 1999 (JP)....1999/021682" should read -- Jan. 29, 1999 (JP)....11-021682 --.

(56) References Cited FOREIGN PATENT DOCUMENTS
"JP 08152985 A * 6/1996" should read -- JP 8-152985 A * 6/1996 --.

DRAWINGS:
Sheet 7, Figure 7, "NOT DISPLAY" (both occurrences) should read -- DO NOT DISPLAY --;
Sheet 20, Figure 22, "NOT" should read -- DO NOT --;
Sheet 22, Figure 24, "AMODE" should read -- A MODE -- ; and
Sheet 26, Figure 28, "AMODE" should read -- A MODE --.

COLUMN 1:
Line 36, "seta" should read -- set a --.

COLUMN 9:
Line 18, "etc." should read -- etc., --.

COLUMN 10:
Line 32, "options;" should read -- options, --; and
Line 42, ""favorite" is used." should read -- "favorite") is used. --.

COLUMN 13:
Line 33, "being" should be deleted.

UNITED STATES PATENT AND TRADEMARK OFFICE
CERTIFICATE OF CORRECTION

PATENT NO.       : 7,057,747 B1
APPLICATION NO.  : 09/492336
DATED            : June 6, 2006
INVENTOR(S)      : Tomonori Minagawa It is certified that error appears in the above-identified patent and that said Letters Patent is hereby corrected as shown below:

<u>COLUMN 14</u>:
Line 66, "a item" should read -- an item --.

Signed and Sealed this

Twenty-sixth Day of June, 2007

JON W. DUDAS
*Director of the United States Patent and Trademark Office*